United States Patent
Wang et al.

(10) Patent No.: US 12,114,173 B2
(45) Date of Patent: Oct. 8, 2024

(54) USER-EQUIPMENT-COORDINATION SET FOR A WIRELESS NETWORK USING AN UNLICENSED FREQUENCY BAND

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 361 days.

(21) Appl. No.: 17/423,836

(22) PCT Filed: Feb. 12, 2020

(86) PCT No.: PCT/US2020/017930
§ 371 (c)(1),
(2) Date: Jul. 16, 2021

(87) PCT Pub. No.: WO2020/172022
PCT Pub. Date: Aug. 27, 2020

(65) Prior Publication Data
US 2022/0086653 A1    Mar. 17, 2022

Related U.S. Application Data

(60) Provisional application No. 62/808,777, filed on Feb. 21, 2019.

(51) Int. Cl.
*H04W 16/14* (2009.01)
*H04W 74/0808* (2024.01)
*H04W 84/12* (2009.01)

(52) U.S. Cl.
CPC ....... *H04W 16/14* (2013.01); *H04W 74/0808* (2013.01); *H04W 84/12* (2013.01)

(58) Field of Classification Search
None
See application file for complete search history.

(56) References Cited

U.S. PATENT DOCUMENTS 6,038,448 A    3/2000 Chheda et al.
6,665,521 B1   12/2003 Gorday et al.
(Continued)

FOREIGN PATENT DOCUMENTS

CN    101764634    6/2010
CN    101867451    10/2010
(Continued)

OTHER PUBLICATIONS

"Foreign Office Action", EP Application No. 19827946.5, Feb. 24, 2023, 7 pages.
(Continued)

*Primary Examiner* — Xavier S Wong
(74) *Attorney, Agent, or Firm* — Colby Nipper PLLC

(57) ABSTRACT

This document describes techniques and apparatuses for joint-transmission over an unlicensed frequency band using a user equipment (UE)-coordination set. In aspects, a first UE in a UE-coordination set acts as a coordinating UE. The coordinating UE receives, using a local wireless network connection, uplink data from a second UE in the UE-coordination set. The coordinating UE distributes, using the local wireless network connection, the uplink data to at least a third UE in the UE-coordination set. The coordinating UE receives, from at least one UE in the UE-coordination set, respective results of a clear channel assessment of the unlicensed frequency band. The coordinating UE determines a specified time to begin joint-transmission of the uplink data based on the results and coordinates the joint-transmission by directing the at least one UE to initiate the joint-transmission of the uplink data based on the specified time.

19 Claims, 10 Drawing Sheets

(56) References Cited

U.S. PATENT DOCUMENTS

| | | | |
|---|---|---|---|
| 6,898,430 B1 | 5/2005 | Liberti et al. |
| 8,023,463 B2 | 9/2011 | Dick et al. |
| 8,315,629 B2 | 11/2012 | Pamp et al. |
| 8,483,184 B2 | 7/2013 | Yokoyama et al. |
| 8,559,992 B2 | 10/2013 | Larsson et al. |
| 8,665,806 B2 | 3/2014 | Wang et al. |
| 8,706,156 B2 | 4/2014 | Han et al. |
| 9,008,678 B2 | 4/2015 | Schoenerstedt |
| 9,036,613 B2 | 5/2015 | Bleugels et al. |
| 9,100,095 B2 | 8/2015 | Mantri |
| 9,210,550 B2 | 12/2015 | Koc et al. |
| 9,253,783 B2 | 2/2016 | Wang et al. |
| 9,271,194 B2 | 2/2016 | Lu et al. |
| 9,344,159 B2 | 5/2016 | Zhuang |
| 9,374,772 B2 | 6/2016 | Daoud |
| 9,380,533 B2 | 6/2016 | Chung et al. |
| 9,674,863 B2 | 6/2017 | Cheng et al. |
| 9,699,731 B2 | 7/2017 | Khoryaev et al. |
| 9,743,329 B2 | 8/2017 | Xiao et al. |
| 9,780,842 B2 | 10/2017 | Boudreau et al. |
| 9,941,939 B2 | 4/2018 | Parl et al. |
| 9,985,750 B2 | 5/2018 | Maaref et al. |
| 10,045,376 B2 | 8/2018 | Yang et al. |
| 10,178,696 B2 | 1/2019 | Cheng et al. |
| 10,201,003 B2 | 2/2019 | Guo et al. |
| 10,218,422 B2 | 2/2019 | Raghavan et al. |
| 10,313,850 B2 | 6/2019 | Choi et al. |
| 10,321,414 B2 | 6/2019 | Guo et al. |
| 10,412,691 B1 | 9/2019 | Marupaduga et al. |
| 10,542,556 B2 | 1/2020 | Mallik |
| 10,834,645 B2 | 11/2020 | Wang et al. |
| 10,893,572 B2 | 1/2021 | Wang et al. |
| 11,134,092 B2 | 9/2021 | Michael et al. |
| 11,350,439 B2 | 5/2022 | Wang et al. |
| 11,638,272 B2 | 4/2023 | Wang et al. |
| 11,641,566 B2 | 5/2023 | Wang et al. |
| 11,889,322 B2 | 1/2024 | Wang et al. |
| 11,956,850 B2 | 4/2024 | Wang et al. |
| 2003/0002460 A1 | 1/2003 | English |
| 2004/0203973 A1 | 10/2004 | Khan |
| 2004/0233858 A1 | 11/2004 | Karaoguz |
| 2006/0116156 A1 | 6/2006 | Haseba et al. |
| 2006/0128312 A1 | 6/2006 | Declerck et al. |
| 2006/0203731 A1 | 9/2006 | Tiedemann et al. |
| 2009/0175214 A1 | 7/2009 | Sfar et al. |
| 2009/0176494 A1 | 7/2009 | Lee et al. |
| 2010/0027487 A1 | 2/2010 | Ihm et al. |
| 2010/0103983 A1 | 4/2010 | Wang et al. |
| 2010/0118752 A1 | 5/2010 | Suzuki et al. |
| 2010/0142462 A1 | 6/2010 | Wang et al. |
| 2010/0173660 A1 | 7/2010 | Liu et al. |
| 2010/0210246 A1 | 8/2010 | Yang et al. |
| 2010/0297993 A1 | 11/2010 | Heo et al. |
| 2011/0080893 A1 | 4/2011 | Fong et al. |
| 2011/0096751 A1 | 4/2011 | Ma et al. |
| 2011/0124294 A1 | 5/2011 | Dwyer et al. |
| 2011/0158117 A1 | 6/2011 | Ho et al. |
| 2011/0281585 A1 | 11/2011 | Kwon et al. |
| 2012/0087273 A1 | 4/2012 | Koo et al. |
| 2012/0102409 A1 | 4/2012 | Fan et al. |
| 2012/0120821 A1 | 5/2012 | Kazmi et al. |
| 2012/0157139 A1 | 6/2012 | Noh et al. |
| 2012/0178462 A1 | 7/2012 | Kim |
| 2012/0218968 A1 | 8/2012 | Kim et al. |
| 2012/0264443 A1 | 10/2012 | Ng et al. |
| 2013/0034136 A1 | 2/2013 | Park et al. |
| 2013/0039287 A1 | 2/2013 | Rayavarapu et al. |
| 2013/0041954 A1 | 2/2013 | Kim et al. |
| 2013/0053045 A1 | 2/2013 | Chuang |
| 2013/0053079 A1 | 2/2013 | Kwun et al. |
| 2013/0089058 A1 | 4/2013 | Yang et al. |
| 2013/0107848 A1 | 5/2013 | Kang et al. |
| 2013/0122918 A1 | 5/2013 | Baley et al. |
| 2013/0130684 A1 | 5/2013 | Gomes et al. |
| 2013/0138817 A1 | 5/2013 | Zhang et al. |
| 2013/0150106 A1 | 6/2013 | Bucknell et al. |
| 2013/0182628 A1 | 7/2013 | Gholmieh et al. |
| 2013/0225184 A1 | 8/2013 | Liu et al. |
| 2013/0242787 A1 | 9/2013 | Sun et al. |
| 2013/0244682 A1 | 9/2013 | Schoenerstedt |
| 2013/0329711 A1 | 12/2013 | Seo et al. |
| 2014/0010131 A1 | 1/2014 | Gaal et al. |
| 2014/0112184 A1 | 4/2014 | Chai |
| 2014/0127991 A1 | 5/2014 | Lim et al. |
| 2014/0148168 A1 | 5/2014 | Aoyagi et al. |
| 2014/0169201 A1 | 6/2014 | Tamura et al. |
| 2014/0169261 A1 | 6/2014 | Ming et al. |
| 2014/0177456 A1 | 6/2014 | Boudreau et al. |
| 2014/0226575 A1 | 8/2014 | Davydov et al. |
| 2014/0269632 A1 | 9/2014 | Blankenship et al. |
| 2014/0274081 A1 | 9/2014 | Comeau et al. |
| 2014/0321433 A1 | 10/2014 | Xiao et al. |
| 2014/0348104 A1 | 11/2014 | Morita |
| 2014/0376478 A1 | 12/2014 | Morita |
| 2015/0038083 A1 | 2/2015 | Patro et al. |
| 2015/0043390 A1 | 2/2015 | Wang et al. |
| 2015/0065148 A1 | 3/2015 | De Pasquale et al. |
| 2015/0098397 A1 | 4/2015 | Damnjanovic et al. |
| 2015/0139197 A1 | 5/2015 | He et al. |
| 2015/0139203 A1 | 5/2015 | Miryala et al. |
| 2015/0163822 A1 | 6/2015 | Guo et al. |
| 2015/0195795 A1 | 7/2015 | Loehr et al. |
| 2015/0244489 A1 | 8/2015 | Wang |
| 2015/0288427 A1 | 10/2015 | Wang et al. |
| 2015/0326282 A1 | 11/2015 | Futaki |
| 2015/0358860 A1 | 12/2015 | Lu et al. |
| 2015/0373730 A1 | 12/2015 | Fujishiro et al. |
| 2015/0382142 A1 | 12/2015 | Kim et al. |
| 2016/0007138 A1 | 1/2016 | Palanisamy et al. |
| 2016/0021526 A1 | 1/2016 | Niu et al. |
| 2016/0021623 A1 | 1/2016 | Guo et al. |
| 2016/0028448 A1 | 1/2016 | Park et al. |
| 2016/0044634 A1 | 2/2016 | Seo et al. |
| 2016/0057604 A1 | 2/2016 | Luo et al. |
| 2016/0057663 A1 | 2/2016 | Teyob et al. |
| 2016/0088642 A1* | 3/2016 | Yang .................. H04W 16/14 |
| | | 455/451 |
| 2016/0128123 A1 | 5/2016 | Li |
| 2016/0174278 A1 | 6/2016 | Gao et al. |
| 2016/0192420 A1 | 6/2016 | Kim et al. |
| 2016/0192433 A1 | 6/2016 | Deenoo et al. |
| 2016/0227463 A1 | 8/2016 | Baligh et al. |
| 2016/0234841 A1* | 8/2016 | Pao .................... H04W 72/54 |
| 2016/0323832 A1 | 11/2016 | Love et al. |
| 2016/0374026 A1 | 12/2016 | Dinan |
| 2017/0070931 A1 | 3/2017 | Huang et al. |
| 2017/0078333 A1 | 3/2017 | Tevlin |
| 2017/0086061 A1 | 3/2017 | Huang et al. |
| 2017/0105147 A1 | 4/2017 | Jiang et al. |
| 2017/0164252 A1 | 6/2017 | Chaudhuri et al. |
| 2017/0188206 A1 | 6/2017 | Schmitt et al. |
| 2017/0188406 A1 | 6/2017 | Baligh et al. |
| 2017/0230986 A1 | 8/2017 | Moon et al. |
| 2017/0250786 A1 | 8/2017 | Better et al. |
| 2017/0148173 A1 | 9/2017 | Yang |
| 2017/0265227 A1 | 9/2017 | Wang et al. |
| 2017/0290030 A1 | 10/2017 | Wang et al. |
| 2017/0332389 A1 | 11/2017 | Sun et al. |
| 2017/0339530 A1 | 11/2017 | Maaref |
| 2017/0359759 A1 | 12/2017 | Brown et al. |
| 2018/0013533 A1 | 1/2018 | Yang et al. |
| 2018/0027393 A1 | 1/2018 | Yang et al. |
| 2018/0062770 A1 | 3/2018 | Relal et al. |
| 2018/0146471 A1 | 5/2018 | Xu et al. |
| 2018/0152949 A1 | 5/2018 | Guo et al. |
| 2018/0152951 A1 | 5/2018 | Zhuang et al. |
| 2018/0213450 A1 | 7/2018 | Futaki et al. |
| 2018/0220403 A1 | 8/2018 | Wilson et al. |
| 2018/0235020 A1 | 8/2018 | Maaref |
| 2018/0249483 A1 | 8/2018 | Chen |
| 2018/0352511 A1 | 12/2018 | Martin et al. |
| 2019/0007844 A1 | 1/2019 | Müller et al. |
| 2019/0028348 A1 | 1/2019 | Chai |
| 2019/0037560 A1 | 1/2019 | Huang et al. |

(56) References Cited

U.S. PATENT DOCUMENTS

| | | | |
|---|---|---|---|
| 2019/0053235 | A1 | 2/2019 | Novlan et al. |
| 2019/0075581 | A1* | 3/2019 | Salem .............. H04W 72/1268 |
| 2019/0075604 | A1 | 3/2019 | Wang et al. |
| 2019/0081657 | A1 | 3/2019 | Zeng et al. |
| 2019/0082331 | A1 | 3/2019 | Raghavan et al. |
| 2019/0082371 | A1 | 3/2019 | Burt et al. |
| 2019/0082428 | A1 | 3/2019 | Maaref et al. |
| 2019/0110318 | A1* | 4/2019 | Zhang ................ H04B 17/309 |
| 2019/0132882 | A1 | 5/2019 | Li et al. |
| 2019/0165843 | A1 | 5/2019 | Wu et al. |
| 2019/0174346 | A1 | 6/2019 | Murray et al. |
| 2019/0174472 | A1 | 6/2019 | Lee et al. |
| 2019/0215048 | A1 | 7/2019 | Cirik et al. |
| 2019/0253106 | A1 | 8/2019 | Raghavan et al. |
| 2019/0312616 | A1 | 10/2019 | Christoffersson et al. |
| 2019/0363843 | A1 | 11/2019 | Gordaychik |
| 2020/0015192 | A1 | 1/2020 | Chun |
| 2020/0022043 | A1 | 1/2020 | Pelletier et al. |
| 2020/0022174 | A1 | 1/2020 | Karaki et al. |
| 2020/0037119 | A1 | 1/2020 | Yang |
| 2020/0092685 | A1 | 3/2020 | Fehrenbach et al. |
| 2020/0137591 | A1 | 4/2020 | Smith et al. |
| 2020/0137754 | A1 | 4/2020 | Kim et al. |
| 2020/0154442 | A1 | 5/2020 | Zhou |
| 2020/0178131 | A1 | 6/2020 | Wang et al. |
| 2020/0187281 | A1 | 6/2020 | Wang et al. |
| 2020/0322962 | A1 | 10/2020 | Wang et al. |
| 2020/0329503 | A1 | 10/2020 | Da Silva et al. |
| 2020/0374970 | A1 | 11/2020 | Wang et al. |
| 2020/0396763 | A1 | 12/2020 | Lee et al. |
| 2021/0028978 | A1 | 1/2021 | Zhou et al. |
| 2021/0029516 | A1 | 1/2021 | Wang et al. |
| 2021/0054964 | A1 | 3/2021 | Wang et al. |
| 2021/0160850 | A1 | 5/2021 | Akkarakaran et al. |
| 2021/0345358 | A1 | 11/2021 | Wang et al. |
| 2021/0345381 | A1 | 11/2021 | Wang et al. |
| 2021/0385903 | A1 | 12/2021 | Wang et al. |
| 2022/0006493 | A1 | 1/2022 | Wang et al. |
| 2022/0052745 | A1 | 2/2022 | Li |
| 2022/0141676 | A1 | 5/2022 | Wang et al. |
| 2022/0191967 | A1 | 6/2022 | Wang et al. |

FOREIGN PATENT DOCUMENTS

| | | |
|---|---|---|
| CN | 102577150 A | 7/2012 |
| CN | 102585429 | 7/2012 |
| CN | 102838297 | 8/2012 |
| CN | 103313197 | 9/2013 |
| CN | 103858475 A | 6/2014 |
| CN | 104429142 | 3/2015 |
| CN | 104641570 A | 5/2015 |
| CN | 104756425 | 7/2015 |
| CN | 104885391 | 9/2015 |
| CN | 107135490 | 9/2017 |
| CN | 107211271 | 9/2017 |
| CN | 107872889 | 4/2018 |
| CN | 109246708 | 1/2019 |
| CN | 109314561 A | 2/2019 |
| CN | 109417409 A | 3/2019 |
| EP | 2809104 | 12/2014 |
| EP | 2953393 | 12/2015 |
| EP | 3282786 | 2/2018 |
| EP | 3425936 | 1/2019 |
| KR | 20080089457 | 10/2008 |
| KR | 20090118058 | 11/2009 |
| WO | WO-0237771 | 5/2002 |
| WO | WO-2008147654 | 12/2008 |
| WO | 2011140715 | 11/2011 |
| WO | WO-2012114151 | 8/2012 |
| WO | 2013057047 | 4/2013 |
| WO | WO-2013091229 | 6/2013 |
| WO | WO-2014074919 | 5/2014 |
| WO | 2014165086 | 10/2014 |
| WO | WO-2014179958 | 11/2014 |
| WO | WO-2015074270 | 5/2015 |
| WO | 2015123405 | 8/2015 |
| WO | WO-2015163798 | 10/2015 |
| WO | WO-2016081375 | 5/2016 |
| WO | WO-2016191091 | 12/2016 |
| WO | 2017023785 | 2/2017 |
| WO | 2017117253 | 7/2017 |
| WO | WO-2017117340 | 7/2017 |
| WO | WO-2017148173 | 9/2017 |
| WO | WO-2018010818 | 1/2018 |
| WO | 2016163206 | 2/2018 |
| WO | WO-2018020015 | 2/2018 |
| WO | WO-2018031770 | 2/2018 |
| WO | 2018044392 A | 3/2018 |
| WO | WO-2018073485 | 4/2018 |
| WO | WO-2018130115 | 7/2018 |
| WO | WO-2018169343 | 9/2018 |
| WO | WO-2018192699 | 10/2018 |
| WO | WO-2018202797 | 11/2018 |
| WO | WO-2018202798 | 11/2018 |
| WO | WO-2019001039 | 1/2019 |
| WO | WO-2019016141 | 1/2019 |
| WO | WO-2019038700 | 2/2019 |
| WO | WO-2018025789 | 5/2019 |
| WO | WO-2020112680 | 6/2020 |
| WO | WO-2020113010 | 6/2020 |
| WO | WO-2020117558 | 6/2020 |
| WO | WO-2020139811 | 7/2020 |
| WO | WO-2020142532 | 7/2020 |
| WO | WO-2020159773 | 8/2020 |
| WO | WO-2020172022 | 8/2020 |
| WO | WO-2020186097 | 9/2020 |
| WO | WO-2020236429 | 11/2020 |
| WO | 2021002859 | 1/2021 |
| WO | WO-2021015774 | 1/2021 |
| WO | WO-2021029879 | 2/2021 |
| WO | WO-2021054963 | 3/2021 |
| WO | WO-2021054964 | 3/2021 |
| WO | WO-2021080666 | 4/2021 |

OTHER PUBLICATIONS

"Notice of Allowance", U.S. Appl. No. 16/969,105, filed Feb. 1, 2023, 7 pages.

"Notice of Allowance", U.S. Appl. No. 16/963,623, filed Feb. 22, 2023, 5 pages.

"3GPP TS 24.501 V16.3.0", 3GPP TS 24.501 version 16.3.0, Dec. 2019, 645 pages.

"3GPP TSG RAN WG4 25.942 V2.0.0: "RF System Scenarios"", TSG RAN Working Group 4 (Radio) Meeting #8, Oct. 1999, 65 pages.

"3rd Generation Partnership Project; Technical Specification Group Services and System Aspects; Security architecture and procedures for 5G system", 3GPP TS 33.501 version 16.1.0 Release 16, Dec. 2019, 202 pages.

"5G; Non-Access-Stratum (NAS) protocol for 5G System (5GS); Stage 3", 3GPP TS 24.501 version 15.1.0 Release 15, Oct. 2018, 406 pages.

"5G; Study on New Radio (NR) Access Technology", ETSI TR 138 912; V14.0.0; Technical Report; 3GPP TR 38.912 version 14.0.0 Release 14, May 2017, 77 pages.

"Beam Management and Beam Reporting", 3GPP TSG RAN WG1 Meeting #88bis, R1-1704488, Apr. 2017, 7 pages.

"Corrected Notice of Allowance", U.S. Appl. No. 16/419,854, filed Dec. 16, 2020, 2 pages.

"Discussion on HARQ Management and HARQ-ACK Feedback", 3GPP TSG RAN WG1 Meeting #91, R1-1720203, Dec. 2017, 5 pages.

"Discussion on NR Beamforming with UE-Group-Specific Beam Sweeping", 3GPP TSG-RAN WG1 Meeting #86 R1-166219, Aug. 22, 2016, 7 pages.

"Final Office Action", U.S. Appl. No. 16/210,969, filed Jan. 7, 2021, 17 pages.

"International Preliminary Report on Patentability", Application No. PCT/US2019/069129, Apr. 7, 2021, 14 pages.

(56) References Cited

OTHER PUBLICATIONS

"International Preliminary Report on Patentability", Application No. PCT/US2019/068265, Jan. 18, 2021, 31 pages.
"International Preliminary Report on Patentability", Application No. PCT/US2019/068265, Jan. 18, 2021, 33 pages.
"International Preliminary Report on Patentability", Application No. PCT/US2019/051980, Dec. 8, 2020, 7 pages.
"International Preliminary Report on Patentability", Application No. PCT/US2019/063240, Feb. 18, 2021, 8 pages.
"International Preliminary Report on Patentability", Application No. PCT/US2019/063620, May 25, 2021, 8 pages.
"International Search Report and Written Opinion", Application No. PCT/US2019/051980, Jul. 27, 2020, 19 pages.
"International Search Report and Written Opinion", Application No. PCT/US2019/043355, Mar. 31, 2020, 12 pages.
"International Search Report and Written Opinion", Application No. PCT/US2020/014638, May 13, 2020, 12 pages.
"International Search Report and Written Opinion", Application No. PCT/US2020/045777, Oct. 9, 2020, 13 pages.
"International Search Report and Written Opinion", Application No. PCT/US2019/069129, Mar. 31, 2020, 13 pages.
"International Search Report and Written Opinion", Application No. PCT/US2019/046374, Apr. 14, 2020, 13 pages.
"International Search Report and Written Opinion", Application No. PCT/US2020/022460, May 26, 2020, 13 pages.
"International Search Report and Written Opinion", Application No. PCT/US2020/031716, Jul. 20, 2020, 14 pages.
"International Search Report and Written Opinion", Application No. PCT/US2019/063081, Feb. 21, 2020, 14 pages.
"International Search Report and Written Opinion", Application No. PCT/US2019/063620, Mar. 9, 2020, 14 pages.
"International Search Report and Written Opinion", Application No. PCT/US2019/052005, May 18, 2020, 14 pages.
"International Search Report and Written Opinion", Application No. PCT/US2020/017930, May 29, 2020, 14 pages.
"International Search Report and Written Opinion", Application No. PCT/US2019/063240, Feb. 13, 2020, 16 pages.
"International Search Report and Written Opinion", Application No. PCT/US2019/068265, Apr. 29, 2020, 29 pages.
"Invitation to Pay Additional Fees", Application No. PCT/US2019/051980, Jun. 4, 2020, 10 pages.
"Invitation to Pay Additional Fees", Application No. PCT/US2019/068265, Mar. 13, 2020, 13 pages.
"LTE; Evolved Universal Terrestrial Radio Access (E-UTRA) and Evolved Universal Terrestrial Radio Access Network (E-UTRAN); Overall Description; Stage 2 (3GPP TS 36.300 version 15.3.0 Release 15)", ETSI TS 136 300 V15.3.0, Oct. 2018, 366 pages.
"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0, Jan. 2020, 137 pages.
"Non-Final Office Action", U.S. Appl. No. 16/210,969, filed Jul. 23, 2020, 15 Pages.
"Non-Final Office Action", U.S. Appl. No. 16/206,579, filed Apr. 10, 2020, 23 Pages.
"Non-Final Office Action", U.S. Appl. No. 16/419,854, filed Jun. 30, 2020, 29 Pages.
"Notice of Allowance", U.S. Appl. No. 16/206,579, filed Jul. 8, 2020, 10 Pages.
"Notice of Allowance", U.S. Appl. No. 16/419,854, filed Nov. 5, 2020, 11 pages.
"On the Need for More Flexible Configurations Related to CSI Reporting", 3GPP TSG RAN WG1 Meeting #87, R1-161123, Nov. 2016, 6 pages.
"Supplemental Notice of Allowance", U.S. Appl. No. 16/206,579, filed Sep. 30, 2020, 3 pages.
"Third Generation Partnership Project; Technical Specification Group Services and System Aspects; Service requirements for the 5G system; Stage 1", 3GPP TS 22.261 version 16.10.0 Release 16, Dec. 2019, 72 pages.
"U.S. Appl. No. 62/785,949", filed Feb. 21, 2019.
"U.S. Appl. No. 62/785,949", filed Dec. 28, 2018.
"UE Overheating for EN-DC", 3GPP R2-1802414, UE overheating for EN-DC, in 3GPP TSG-RAN WG2 Meeting #101, Apple Inc., Mar. 2, 2018, 3 pages.
"Universal Mobile Telecommunications System (UMTS); Automatic Neighbour Relation (ANR) for UTRAN", 3GPP TS 25.484 version 10.0.1 Release 10, Jan. 2012, 21 pages.
"Universal Mobile Telecommunications System (UMTS); Automatic Neighbour Relation (ANR) for UTRAN", 3GPP TS 25.484 version 11.0.0 Release 11, Jan. 2012, 22 pages.
"Written Opinion", Application No. PCT/US2019/063240, Oct. 27, 2020, 10 pages.
"Written Opinion", Application No. PCT/US2019/068265, Sep. 25, 2020, 20 pages.
"Written Opinion", Application No. PCT/US2020/014638, Nov. 26, 2020, 5 pages.
"Written Opinion", Application No. PCT/US2020/031716, Mar. 25, 2021, 6 pages.
"Written Opinion", Application No. PCT/US2019/069129, Dec. 14, 2020, 7 pages.
Aboba, B. et al., "Extensible Authentication Protocol (EAP)", RFC Editor; Retrieved from https://www.rfc-editor.org/info/rfc3748, Jun. 2004, 67 pages.
Fodor, Gabor et al., "Design Aspects of Network Assisted Device-to-Device Communications", IEEE Communications Magazine, May 2011, 9 pages.
Gorcin, Ali et al., "Hybrid Automatic Neighbor Relations for 5G Wireless Networks", 2017, 6 pages.
Klingenbrunn, Thomas et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.
Lin, Roy et al., "Handling of Extensible Authentication Protocol Based Non-Access Stratum Authentication Failures", Technical Disclosure Commons; Retrieved from https://www.tdcommons.org/dpubs_series/3191, Apr. 23, 2020, 11 pages.
Son, Harrison J., "7 Deployment Scenarios of Private 5G Networks", Netmanias; Retrieved from https://www.netmanias.com/en/post/blog/14500/5g-edge-kt-sk-telecom/7-deployment-scenarios-of-private-5g-networks, Oct. 21, 2019, 11 pages.
Tavanpour, Misagh, "Upload User Collaboration in the Data Upload for LTE-Advanced Networks", Carleton University, Ottawa, Ontario, Jan. 2016, 199 pages.
Wu, Chih-Hsiang, "Handling Overheating in a Wireless-Communication Device", Technical Disclosure Commons; Retrieved from https://www.tdcommons.org/dpubs_series/2343, Jul. 12, 2019, 22 pages.
Zhang, Jinfang et al., "PoC of SCMA-Based Uplink Grant-Free Transmission in UCNC for 5G", IEEE Journal on Selected Areas in Communications, vol. 35, No. 6, Jun. 2017, 10 pages.
Zhang, Jinyu et al., "Grant-less Uplink Transmission for LTE Operated in Unlicensed Spectrum", Feb. 14, 2018, 6 pages.
"Written Opinion", Application No. PCT/US2020/031716, Aug. 20, 2021, 6 pages.
"International Preliminary Report on Patentability", Application No. PCT/US2020/031716, Jul. 30, 2021, 7 pages.
"International Preliminary Report on Patentability", Application No. PCT/US2020/017930, Aug. 10, 2021, 9 pages.
"International Preliminary Report on Patentability", Application No. PCT/US2020/022460, Aug. 25, 2021, 8 pages.
"Non-Final Office Action", U.S. Appl. No. 16/969,539, filed Sep. 16, 2021, 13 pages.
"Foreign Office Action", KR Application No. 10-2020-7022366, Feb. 23, 2022, 11 pages.
"Foreign Ofice Action", IN Application No. 202147031380, Mar. 8, 2022, 8 pages.
"Foreign Office Action", IN Application No. 202147025618, Mar. 11, 2022, 5 pages.
"Foreign Office Action", IN Application No. 202147051065, Mar. 28, 2022, 8 pages.
"Foreign Office Action", IN Application No. 202147041653, Apr. 26, 2022, 6 pages.

(56) References Cited

OTHER PUBLICATIONS

"Non-Final Office Action", U.S. Appl. No. 16/969,105, filed Apr. 29, 2022, 8 pages.
"Notice of Allowance", U.S. Appl. No. 16/969,539, filed Mar. 30, 2022, 5 pages.
"Foreign Ofice Action", EP Application No. 19842524.1, May 11, 2023, 22 pages.
"Notice of Allowance", U.S. Appl. No. 17/287,898, filed Jun. 26, 2023, 12 pages.
"Coordinated Multi-Point Transmission—Exploring Possible System Operations and UE Support", TSG-RAN WG1 #55—R1-084407, Nov. 10, 2008, 5 pages.
"Final Office Action", U.S. Appl. No. 17/311,996, filed Feb. 20, 2024, 9 pages.
"Foreign Office Action", CN Application No. 201980082695.3, Jan. 20, 2024, 8 pages.
"Foreign Office Action", CN Application No. 201980012509.9, Feb. 8, 2024, 28 pages.
"Foreign Office Action", CN Application No. 202080010100.6, Dec. 1, 2023, 10 pages.
"Notice of Allowance", U.S. Appl. No. 17/603,328, filed Dec. 27, 2023, 11 pages.
"Notice of Allowance", U.S. Appl. No. 16/963,623, filed Jul. 25, 2022, 8 pages.
"Foreign Office Action", EP Application No. 19756050.1, Jan. 24, 2022, 4 pages.
"International Preliminary Report on Patentability", Application No. PCT/US2019/043355, Jan. 25, 2022, 7 pages.
"Non-Final Office Action", U.S. Appl. No. 16/963,623, filed Jan. 5, 2022, 12 pages.
"Notice of Allowance", U.S. Appl. No. 16/969,105, filed Feb. 7, 2022, 7 pages.
"Notice of Allowance", U.S. Appl. No. 16/969,539, filed Dec. 30, 2021, 8 pages.
"Foreign Office Action", TW Application No. 20209124827, Sep. 17, 2021, 13 pages.
"International Preliminary Report on Patentability", Application No. PCT/US2020/031716, Oct. 15, 2021, 7 pages.
"Foreign Office Action", CN Application No. 201980082695.3, Aug. 31, 2023, 25 pages.
"Foreign Office Action", TW Application No. 111132535, Oct. 20, 2023, 8 pages.
"Non-Final Office Action", U.S. Appl. No. 17/603,328, filed Sep. 27, 2023, 8 pages.
"Non-Final Office Action", U.S. Appl. No. 17/311,996, filed Sep. 28, 2023, 8 pages.
"Notice of Allowance", U.S. Appl. No. 17/433,197, filed Oct. 19, 2023, 10 pages.
Trendafilov, et al., "Model of Coordination Flow in Remote Collaborative Interactions", Mar. 2015, 8 pages.
"Final Office Action", U.S. Appl. No. 16/969,105, filed Oct. 11, 2022, 9 pages.
"Foreign Office Action", CA Application No. 3,127,384, Sep. 27, 2022, 4 pages.
"Notice of Allowance", U.S. Appl. No. 16/963,623, filed Oct. 31, 2022, 6 pages.
"Foreign Office Action", EP Application No. 20728338.3, Apr. 19, 2024, 8 pages.
"Foreign Office Action", VN Application No. 1202004517, Apr. 24, 2024, 3 pages.

* cited by examiner

900 ⟶

905
Receive, by a first user equipment that is a coordinating user equipment in a user equipment-coordination set and using a local wireless network, uplink data from a target user equipment that is a second user equipment in the user equipment-coordination set

910
Distribute, using the local wireless network, the uplink data to at least a third user equipment included in the user equipment-coordination set

915
Determine that at least one user equipment in the user equipment-coordination set has initiated transmission of the uplink data over an unlicensed frequency band

920
Coordinate the joint-transmission of the uplink data to a base station by relaying, to one or more other user equipments in the user equipment-coordination set other than the at least one user equipment, transmit timing information associated with the transmission of the uplink data by the at least one user equipment

1005
Receive, over a local wireless network connection and using a first user equipment in a user equipment-coordination set, uplink data from a coordinating user equipment that is a second user equipment in the user-equipment-coordination set

1010
Perform a clear channel assessment on a channel in an unlicensed frequency band, the clear channel assessment generating results that indicate the channel is clear for the joint-transmission of the uplink data

1015
Initiate the joint-transmission of the uplink data

1020
Transmit, over the local wireless network connection and to the coordinating user equipment, an indication of the initiating the joint-transmission

*Fig. 10*

USER-EQUIPMENT-COORDINATION SET FOR A WIRELESS NETWORK USING AN UNLICENSED FREQUENCY BAND

RELATED APPLICATION(S)

This application is a national stage entry of International Application No. PCT/US2020/017930, filed Feb. 12, 2020, which claims the benefit of U.S. Provisional Application No. 62/808,777, filed Feb. 21, 2019, the disclosures which are incorporated herein by reference in their entirety.

BACKGROUND

Generally, a provider of a wireless network manages wireless communications over the wireless network. For example, a provider's base station manages a wireless connection with a user equipment (UE) that is connected to the wireless network. The base station determines configurations for the wireless connection, such as bandwidth, timing, and protocol for the wireless connection.

The quality of service between the UE and the base station can be degraded by a number of factors, such as obstacles that contribute to loss in signal strength, bandwidth limitations, interfering signals, and so forth. A number of solutions have been developed to improve signal quality issues occurring in certain wireless communication systems. However, with recent advancements in wireless communication systems, such as increased data-transmission speeds associated with Fifth Generation New Radio (5G NR), at least some of those previous solutions have become less-efficient.

Further inefficiencies arise when conventional systems that are configured to operate within a licensed frequency band attempt to operate within an unlicensed frequency band. For instance, 5G NR utilizes certain transmission rules, such as Clear Channel Assessment (CCA) as part of Listen-Before-Talk (LBT), to allow different systems, such as Wi-Fi and Cellular systems, to share an unlicensed frequency band with a contention-oriented access while maintaining the performance of each individual system. Since the amount of available licensed spectrum is limited and monetarily costly, offloading of cellular traffic through other forms of network, such as the unlicensed spectrum, has been a useful solution. Delays caused by these transmission rules, however, present unique challenges when attempting to coordinate multiple devices in joint-transmission or reception of data.

SUMMARY

This document describes techniques and apparatuses for a user-equipment-coordination set for a wireless network using an unlicensed frequency band. The techniques described herein overcome challenges in joint-transmission arising from listen-before-talk (LBT) procedures that are required to be performed prior to transmitting on an unlicensed frequency band. In particular, the techniques described herein enable a user equipment (UE) in the UE-coordination set to coordinate timing information among the other UEs in the UE-coordination set. This can allow the UEs to jointly transmit the uplink data in such a way as to enable the base station to efficiently receive and process the joint-transmission. In addition, the base station can specify policies to enable the UE-coordination set to determine an order of UE data bearers when a transmit opportunity presents itself.

In aspects, a first UE in a UE-coordination set is configured as a coordinating UE. The coordinating UE receives, using a local wireless network connection, uplink data from a second user equipment in the user equipment-coordination set, the uplink data intended for joint-transmission in an unlicensed frequency band to a base station. The coordinating UE then distributes, using the local wireless network connection, the uplink data to at least a third UE in the UE-coordination set. Using the local wireless network connection and from at least one UE in the UE-coordination set, the coordinating UE receives respective results of a clear channel assessment of the unlicensed frequency band performed by the at least one UE. In response to receiving the respective results, the coordinating UE determines, based on the respective results, a specified time to begin joint-transmission of the uplink data in the unlicensed frequency band. The coordinating UE then coordinates the joint-transmission of the uplink data in the unlicensed frequency band by directing the at least one UE to initiate the joint-transmission of the uplink data based on the specified time.

In aspects, a UE that is in a UE-coordination set receives, using a local wireless network connection, uplink data from a coordinating UE in the UE-coordination set. The UE performs, in response to receiving the uplink data, a clear channel assessment on a channel in an unlicensed frequency band, where the clear channel assessment generates results that include a backoff time for the UE. In implementations, the UE transmits, using the local wireless network connection and to the coordinating UE, the results. Then, the UE receives, over the local wireless network connection and from the coordinating UE, an indication to initiate the joint-transmission of the uplink data at a specified time that is a different duration of time than the backoff time. In response to receiving the indication, the UE initiates the joint-transmission of the uplink data to the base station based on the specified time.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of a UE-coordination set for a wireless network using an unlicensed frequency band are described below. The use of the same reference numbers in different instances in the description and the figures indicate similar elements:

FIG. 9 describes a method performed by a coordinating UE within a UE-coordination set in a wireless communications network.

FIG. 10 describes a method performed by a UE within a UE-coordination set in a wireless communications network.

DETAILED DESCRIPTION

Overview

Figure 1:
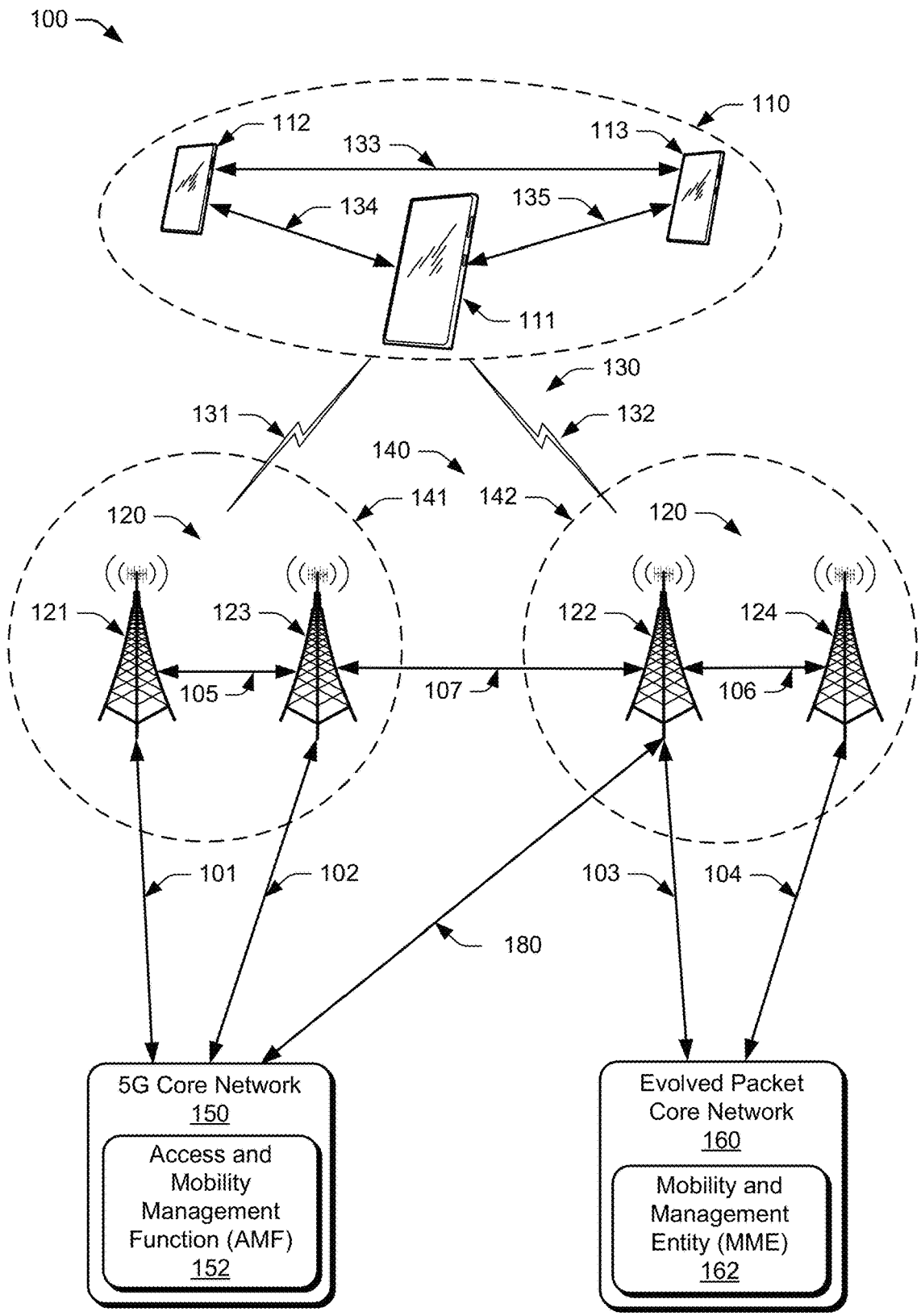
FIG. 1 illustrates an example operating environment in which aspects of a UE-coordination set for a wireless network using an unlicensed frequency band can be implemented.

In conventional wireless communication systems, a signal quality between a user equipment (UE) and a base station can be degraded by a number of factors, such as signal interference or distance between the UE and the base station, resulting in slower and less-efficient data transmission.

This document describes techniques and apparatuses for a UE-coordination set for a wireless network using an unlicensed frequency band. These techniques facilitate faster and more-efficient data transmission in comparison to conventional wireless communication systems. Multiple UEs assigned as a group to function together, similar to a distributed antenna, form a UE-coordination set for the benefit of a particular UE. The UE-coordination set includes a coordinating UE that coordinates joint-transmission and reception of uplink and/or downlink data for the particular UE (e.g., target UE). Combining antennas and transmitters of multiple UEs in the UE-coordination set significantly increases the effective transmission power of the particular UE and greatly improves the effective signal quality for the target UE.

Multiple UEs forming a UE-coordination set, which is specified by the base station, can be used to increase the link budget of a single UE in the UE-coordination set. In one example, multiple UEs carried by a group of hikers in a low radio coverage area can form a UE-coordination set to transmit a message to a base station at a higher effective transmit power than would be possible for an individual UE in that area. Additionally, those UEs can form a UE-coordination set to receive a message from the base station for one of the UEs at a higher effective receive power than would be possible for that one UE to individually receive. One of the multiple UEs acts as a coordinating UE for the UE-coordination group to coordinate joint-transmission of a particular UE's uplink data over an unlicensed frequency band. Prior to an uplink transmission duration, each UE in the UE-coordination set performs a listen-before-talk (LBT) procedure to determine a clear transmission channel According to the LBT rule, to access a wireless communication channel, the UE first detects a status of the channel, such as by performing a Clear Channel Assessment (CCA). If the channel is busy, the UE is not allowed to transmit a signal on that channel for a certain period of time. If, however, the channel is not busy, the UE can transmit a signal on that channel.

With multiple UEs within the UE-coordination set performing CCAs on different channels in the unlicensed frequency band, different UEs may experience different interference and thus require different transmission timing information (e.g., backoff times) for when transmission may begin. These required procedures present challenges in coordinating joint-transmission over the unlicensed frequency band. To address these issues, the coordinating UE communicates with each UE in the UE-coordination set over the local wireless link to track each UE's transmission timing information associated with its LBT procedure. The coordinating UE then manages the joint-transmission by coordinating (e.g., synchronizing) the transmission timing information for all the UEs in the UE-coordination set. In this way, the coordinating UE ensures that the joint-transmission is performed efficiently when using an unlicensed frequency band.

In another example, a single user may have multiple electronic devices, such as a work smartphone, a personal smartphone, and a 5G-enabled watch (smartwatch). These three devices may form a UE-coordination set for joint-transmission and reception of data when they are in a challenging wireless environment (e.g., substantial signal attenuation due to noise bursts, cinderblock walls, tall buildings, mountains, long distance from a base station, and so forth). By forming the UE-coordination set, the work smartphone, the personal smartphone, and the smartwatch can transmit messages to, or receive messages from, the base station at a higher effective transmit or receive power than either of the smartphones or the smartwatch is capable of individually. The work smartphone, the personal smartphone, and/or the smartwatch may also form a UE-coordination set with one or more other devices (e.g., tablet, smart appliance, Internet-of-things device) in the home to further increase the effective transmit and/or receive power of the work smartphone, the personal smartphone, or the smartwatch.

In aspects, a method performed by a UE for coordinating joint-transmission by a UE-coordination set over an unlicensed frequency band is disclosed. The method includes receiving uplink data, from another UE in a UE-coordination set over a local wireless network connection. The UE may be configured to coordinate joint-transmission of uplink data to a base station over the unlicensed frequency band. The method also includes distributing the uplink data over the local wireless network connection to at least one additional UE within the UE-coordination set. The UE-coordination set may include the UE, the other UE, and at least one additional UE. In addition, the method includes receiving messages from multiple UEs within the UE-coordination set over the local wireless network connection that indicate results of respective listen-before-talk (LBT) procedures performed by the multiple UEs on uplink channels of the unlicensed frequency band. In aspects, the results include backoff times for the multiple UEs. The method further includes determining, based on the respective backoff times, a specified time during a channel occupancy time for the multiple UEs within the UE-coordination set to begin joint-transmission of the uplink data. Also, the method includes controlling, based on the specified time, when the joint-transmission begins by directing the multiple UEs to initiate the joint-transmission of the uplink data based on the specified time.

In aspects, a method performed by a user equipment (UE) is disclosed. The method includes receiving uplink data over a local wireless network connection from another UE in a UE-coordination set for joint-transmission to a base station, performing a listen-before-talk (LBT) procedure on a channel in an unlicensed frequency band to determine if the channel is clear, and determining a result of the LBT procedure. In aspects, the result includes a backoff time. The method also includes transmitting the result of the LBT procedure to the other UE within the UE-coordination set over the local wireless network connection, receiving a message from the other UE to wait until a specified time that is different than the backoff time to initiate the joint-transmission of the uplink data, and initiating the joint-transmission of the uplink data based on the specified time.

In aspects, a UE is disclosed that includes a radio frequency (RF) transceiver coupled to a processor and memory system. The processor and memory system includes instructions that are executable to distribute uplink data from a target UE to multiple UEs within a UE-coordination set over a local wireless network connection. In addition, the instructions are executable to receive, over the local wireless network connection, results of listen-before-talk (LBT) procedures performed by the multiple UEs on channels in an unlicensed frequency band, the results including respective backoff times. The instructions are also executable to determine a timing for the joint-transmission of the uplink data based on the respective backoff times. Further, based on the timing for the joint-transmission, the instructions are executable to transmit a message over the local wireless network connection to the multiple UEs to direct the multiple UEs regarding a specified time to initiate the joint-transmission of the uplink data to the base station over the unlicensed frequency band. In addition, the instructions are executable to transmit the uplink data, using the RF transceiver, to the base station based on the specified time.

In aspects, a first UE in a UE-coordination set is configured as a coordinating UE. The coordinating UE receives, using a local wireless network connection, uplink data from a second user equipment in the user equipment-coordination set, the uplink data intended for joint-transmission in an unlicensed frequency band to a base station. The coordinating UE then distributes, using the local wireless network connection, the uplink data to at least a third UE in the UE-coordination set. Using the local wireless network connection and from at least one UE in the UE-coordination set, the coordinating UE receives respective results of a clear channel assessment of the unlicensed frequency band performed by the at least one UE. In response to receiving the respective results, the coordinating UE determines, based on the respective results, a specified time to begin joint-transmission of the uplink data in the unlicensed frequency band. The coordinating UE then coordinates the joint-transmission of the uplink data in the unlicensed frequency band by directing the at least one UE to initiate the joint-transmission of the uplink data based on the specified time.

In aspects, a UE that is in a UE-coordination set receives, using a local wireless network connection, uplink data from a coordinating UE in the UE-coordination set. The UE performs, in response to receiving the uplink data, a clear channel assessment on a channel in an unlicensed frequency band, where the clear channel assessment generates results that include a backoff time for the UE. In implementations, the UE transmits, using the local wireless network connection and to the coordinating UE, the results. Then, the UE receives, over the local wireless network connection and from the coordinating UE, an indication to initiate the joint-transmission of the uplink data at a specified time that is a different duration of time than the backoff time. In response to receiving the indication, the UE initiates the joint-transmission of the uplink data to the base station based on the specified time.

Example Environments

FIG. 1 illustrates an example environment 100, which includes multiple user equipment 110 (UE 110), illustrated as UE 111, UE 112, and UE 113. Each UE 110 can communicate with base stations 120 (illustrated as base stations 121, 122, 123, and 124) through wireless communication links 130 (wireless link 130), illustrated as wireless links 131 and 132. Each UE 110 in a UE-coordination set can communicate with a coordinating UE of the UE-coordination set and/or a target UE in the UE-coordination set through one or more local wireless network connections (e.g., personal area network, near-field communication (NFC), Bluetooth™, sonar, radar, lidar, ZigBee™) such as local wireless network connections 133, 134, and 135. For simplicity, the UE 110 is implemented as a smartphone but may be implemented as any suitable computing or electronic device, such as a smart watch, mobile communication device, modem, cellular phone, gaming device, navigation device, media device, laptop computer, desktop computer, tablet computer, smart appliance, vehicle-based communication system, an Internet-of-things (IoT) device (e.g., sensor node, controller/actuator node, combination thereof), and the like. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base stations 120 communicate with the UE 110 through the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110. Additionally, multiple wireless links 130 may be configured for single-RAT dual connectivity or multi-RAT dual connectivity (MR-DC). Each of these various multiple-link situations tends to increase the power consumption of the UE 110.

The base stations 120 collectively form a Radio Access Network 140 (e.g., RAN, Evolved Universal Terrestrial Radio Access Network, E-UTRAN, 5G NR RAN or NR RAN). The RANs 140 are illustrated as an NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 connect to an Evolved Packet Core 160 (EPC 160). Optionally or additionally, the base station 122 may connect to both the 5GC 150 and EPC 160 networks.

The base stations 121 and 123 connect, at 101 and 102 respectively, to the 5GC 150 through an NG2 interface for control-plane signaling and using an NG3 interface for user-plane data communications. The base stations 122 and 124 connect, at 103 and 104 respectively, to the EPC 160 using an Si interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 180.

In addition to connections to core networks, the base stations 120 may communicate with each other. For example, the base stations 121 and 123 communicate through an Xn interface at 105 and the base stations 122 and 124 communicate through an X2 interface at 106. At least one base station 120 (base station 121 and/or base station 123) in the NR RAN 141 can communicate with at least one base station 120 (base station 122 and/or base station 124) in the E-UTRAN 142 using an Xn interface 107. In aspects, base stations 120 in different RANs (e.g., master base stations 120 of each RAN) communicate with one another using an Xn interface such as Xn interface 107.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility Management Entity 162 (MME 162), which provides control-plane functions, such as registration and authentication of multiple UE 110, authorization, or mobility management in the E-UTRA network. The AMF 152 and the MME 162 communicate with the base stations 120 in the RANs 140 and also communicate with multiple UE 110, using the base stations 120.

Example Devices

Figure 2:
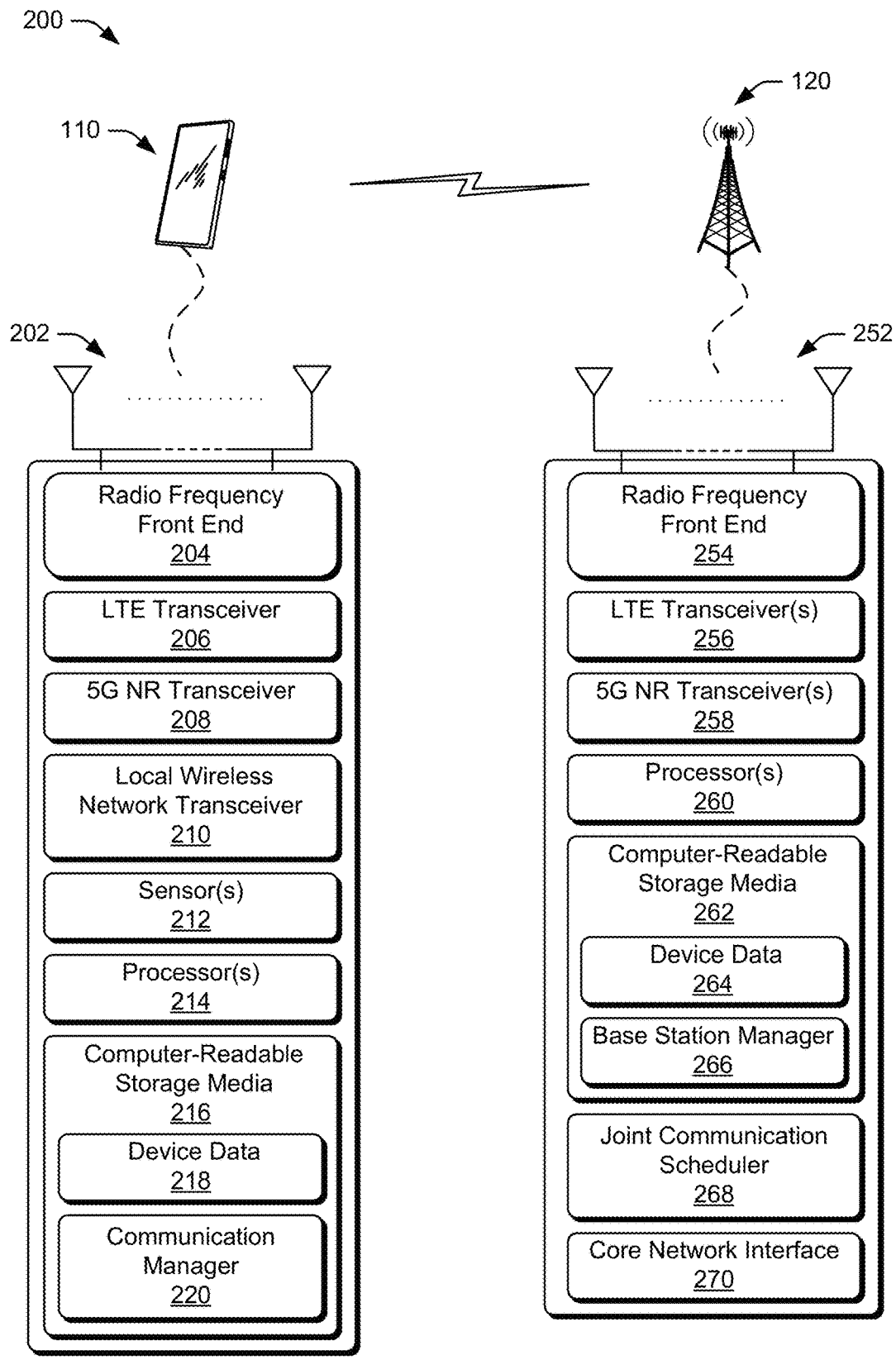
FIG. 2 illustrates an example device diagram of a user equipment and a serving cell base station.

FIG. 2 illustrates an example device diagram 200 of a user equipment and a serving cell base station. In aspects, the device diagram 200 describes devices that can implement various aspects of a UE-coordination set for a wireless network using an unlicensed frequency band. FIG. 2 shows the multiple UEs 110 and the base stations 120. The multiple UE 110 and the base stations 120 may include additional functions and interfaces that are omitted from FIG. 2 for the sake of clarity. The UE 110 includes antennas 202, a radio frequency front end 204 (RF front end 204), and radio-frequency transceivers (e.g., an LTE transceiver 206 and a 5G NR transceiver 208) for communicating with base stations 120 in the 5G RAN 141 and/or the E-UTRAN 142. The UE 110 includes one or more additional transceivers (e.g., local wireless network transceiver 210) for communicating over one or more local wireless networks (e.g., WLAN, Bluetooth, NFC, a personal area network (PAN), WiFi-Direct, IEEE 802.15.4, ZigBee, Thread, mmWave) with at least the coordinating UE, and/or the target UE, of the UE-coordination set. The RF front end 204 of the UE 110 can couple or connect the LTE transceiver 206, the 5G NR transceiver 208, and the local wireless network transceiver 210 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards. Alternatively or additionally, the antennas 202 and the RF front end 204 can be implemented for operation in portions of an unlicensed spectrum. In addition, the RF front end 204 can be tuned to, and/or be tunable to, one or more frequency bands defined and implemented by the local wireless network transceiver 210 to support transmission and reception of communications with other UEs in the UE-coordination set over a local wireless network.

The UE 110 includes sensor(s) 212 can be implemented to detect various properties such as temperature, supplied power, power usage, battery state, or the like. As such, the sensors 212 may include any one or a combination of temperature sensors, thermistors, battery sensors, and power usage sensors.

The UE 110 also includes processor(s) 214 and computer-readable storage media 216 (CRM 216). The processor 214 may be a single core processor or a multiple core processor composed of a variety of materials, such as silicon, polysilicon, high-K dielectric, copper, and so on. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory useable to store device data 218 of the UE 110. The device data 218 includes user data, multimedia data, beamforming codebooks, applications, and/or an operating system of the UE 110, which are executable by processor(s) 214 to enable user-plane communication, control-plane signaling, and user interaction with the UE 110.

CRM 216 also includes a communication manager 220. Alternatively or additionally, the communication manager 220 may be implemented in whole or part as hardware logic or circuitry integrated with or separate from other components of the UE 110. In at least some aspects, the communication manager 220 configures the RF front end 204, the LTE transceiver 206, the 5G NR transceiver 208, and/or the local wireless network transceiver 210 to implement the techniques described herein for a UE-coordination set for a wireless network.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with any UE 110 in a UE-coordination set.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266. Alternatively or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn and/or X2 interface, which the base station manager 266 configures to exchange user-plane and control-plane data between another base station 120, to manage the communication of the base stations 120 with the UE 110. The base stations 120 include a core network interface 270 that the base station manager 266 configures to exchange user-plane and control-plane data with core network functions and/or entities.

Figure 3:
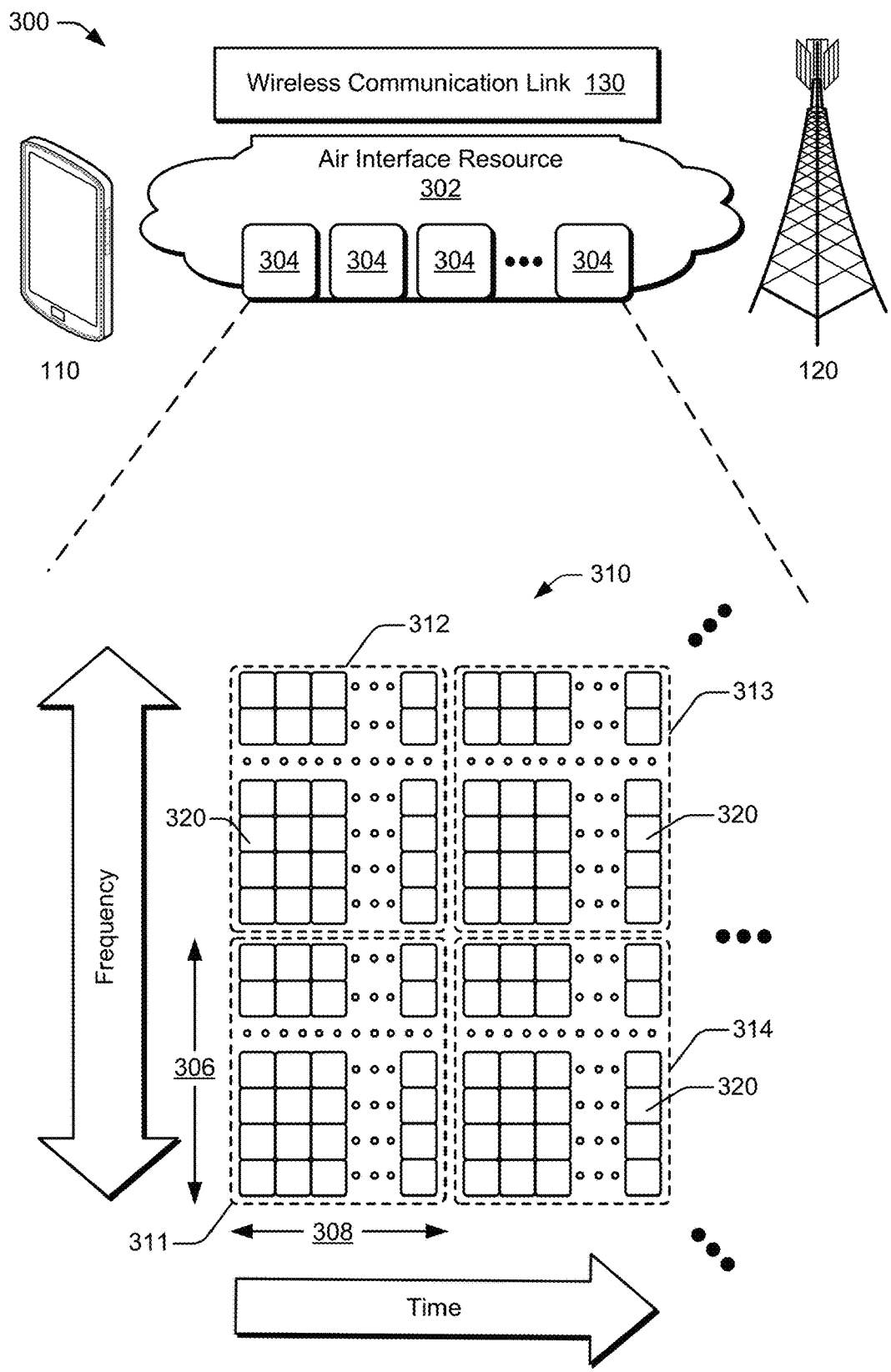
FIG. 3 illustrates an air interface resource that extends between a user equipment and a base station and with which various aspects the described techniques can be implemented.

FIG. 3 illustrates an air interface resource that extends between a user equipment and a base station and with which various aspects of a UE-coordination set for a wireless network using an unlicensed frequency band can be implemented. The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base stations 120 allocate portions (e.g., resource units 304) of the air interface resource 302 for uplink and downlink communications. Each resource block 310 of network access resources may be allocated to support respective wireless communication links 130 of multiple user equipment 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or 7 orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

In example implementations, multiple user equipment 110 (one of which is shown) are communicating with the base stations 120 (one of which is shown) through access provided by portions of the air interface resource 302. The joint communication scheduler 268 (shown in FIG. 2) may determine a respective data-rate, type of information, or amount of information (e.g., data or control information) to be communicated (e.g., transmitted) by the user equipment 110. For example, the joint communication scheduler 268 can determine that each user equipment 110 is to transmit at a different respective data rate or transmit a different respective amount of information. The joint communication scheduler 268 then allocates one or more resource blocks 310 to each user equipment 110 based on the determined data rate or amount of information.

Additionally, or in the alternative to block-level resource grants, the joint communication scheduler 268 may allocate resource units at an element-level. Thus, the joint communication scheduler 268 may allocate one or more resource elements 320 or individual subcarriers to different user equipment 110. By so doing, one resource block 310 can be allocated to facilitate network access for multiple user equipment 110. Accordingly, the joint communication scheduler 268 may allocate, at various granularities, one or up to all subcarriers or resource elements 320 of a resource block 310 to one user equipment 110 or divided across multiple user equipment 110, thereby enabling higher network utilization or increased spectrum efficiency.

The joint communication scheduler 268 can therefore allocate air interface resource 302 by resource unit 304, resource block 310, frequency carrier, time interval, resource element 320, frequency subcarrier, time subinterval, symbol, spreading code, some combination thereof, and so forth. Based on respective allocations of resource units 304, the joint communication scheduler 268 can transmit respective messages to the multiple user equipment 110 indicating the respective allocation of resource units 304 to each user equipment 110. Each message may enable a respective user equipment 110 to queue the information or configure the LTE transceiver 206, the 5G NR transceiver 208, and/or the local wireless network transceiver 210 to communicate via the allocated resource units 304 of the air interface resource 302.

UE-Coordination Set

Figure 4:
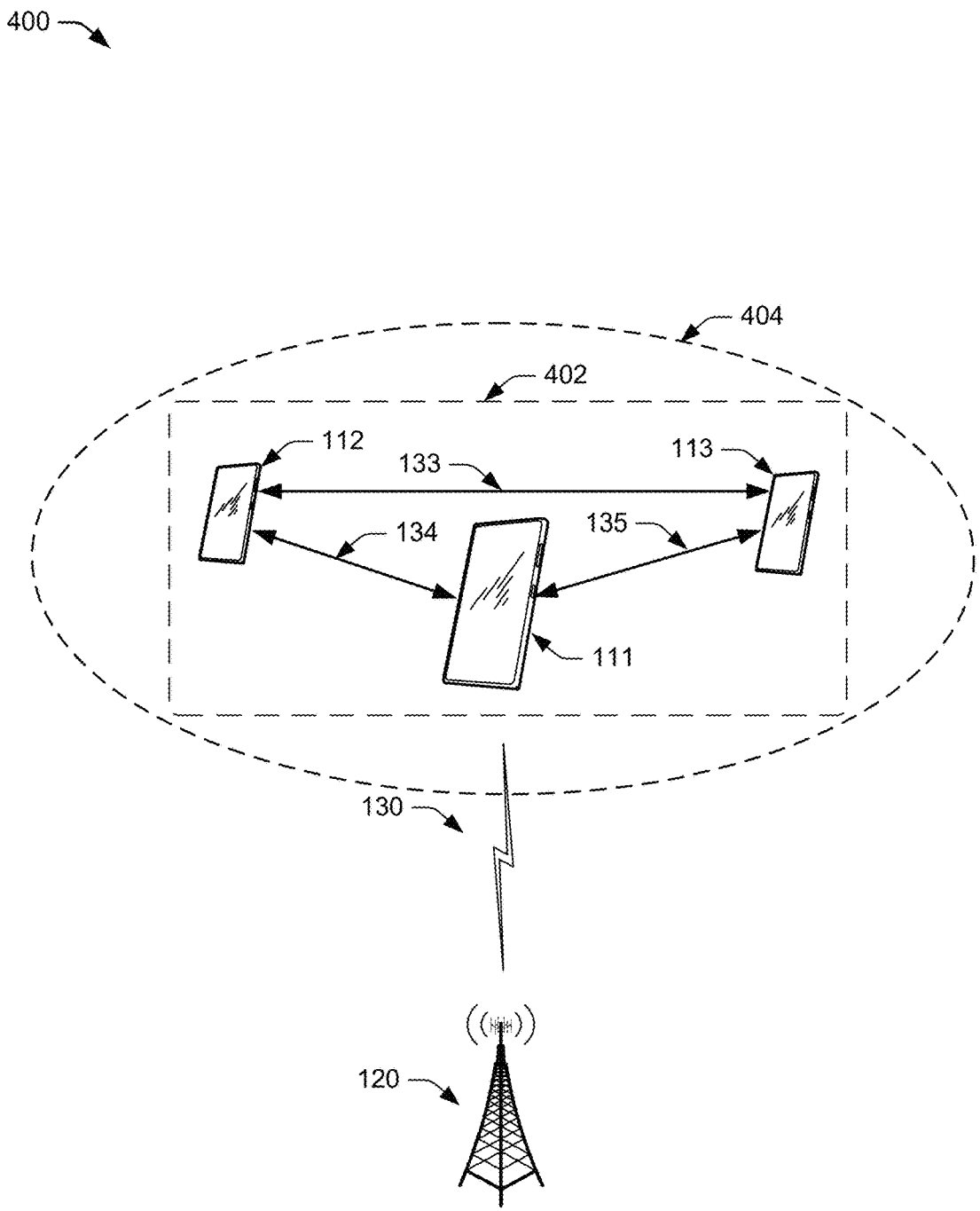
FIG. 4 illustrates an example implementation of a UE-coordination set for a wireless network using an unlicensed frequency band.

FIG. 4 illustrates an example implementation 400 of a UE-coordination set for a wireless network using an unlicensed frequency band. The illustrated example includes a serving cell base station (base station 120), UE 111, UE 112, and UE 113. In an example, each of the UEs illustrated in FIG. 4 may have limited transmission power, which may cause difficulties in transmitting data to the base station 120.

This may be due, at least partially, to the UEs being proximate to a cell edge of the base station 120 or the UEs being in a transmission-challenged location (e.g., a basement, urban canyon, etc.) that has a poor link budget. Each of the UEs illustrated in FIG. 4 may also, or alternatively, have limited reception power, which may be affected by cell-edge transmission power of the base station 120, as well as multipath, signal interference from other transmitters or overhead electrical wires, attenuation from weather or objects such as buildings, trees, etc.

The base station 120 can specify a set of UEs (e.g., the UE 111, UE 112, and UE 113) to form a UE-coordination set (e.g., UE-coordination set 402) for joint-transmission and joint reception of data for a target UE (e.g., the UE 112). Based on a user input or predefined setting, each of the UEs may opt in or out of participation in the UE-coordination set. An effective transmit power of the target UE 112 can increase significantly (e.g., linearly) with the number of UEs in the UE-coordination set, which can greatly improve a link budget of the target UE 112. The base station 120 may determine a UE-coordination set based on various factors, such as a location of each UE relative to the base station 120, distance between the UEs (such as between each other, between each UE and the target UE, or between each UE and a coordinating UE of the UE-coordination set) or a combination thereof. In some aspects, UEs within a certain distance of each other can more easily coordinate with one another to reduce signal interference when in close proximity by using a local wireless network.

In addition, UE coordination can be based on spatial beams or timing advance, or both, associated with each UE. For example, for beamforming or Massive-MIMO, it may be desirable that all the UEs within the UE-coordination set are able to receive the same signal from the base station. Therefore, all the UEs within the UE-coordination set may be geographically near one another, e.g., within a threshold distance of a particular UE in the UE-coordination set. In this way, the UEs in the UE-coordination set may each be in the same beam.

The coordinating UE can coordinate the messages and samples sent between UEs within the UE-coordination set for joint-transmission and joint reception. The coordinating UE communicates with the UEs in the UE-coordination set using a local wireless network, such as mmWave, Bluetooth, and the like.

In the illustrated example 400 in FIG. 4, the base station 120 may select UE 111 to act as the coordinating UE because the UE 111 is capable of communicating with each of the other UEs 112 and 113 in the UE-coordination set 402. The base station 120 may select the coordinating UE for various reasons, examples of which are described above. In this example, at least target UE 112 has a weak cellular transmission (and reception) power. The base station 120 selects UE 111 to coordinate messages and samples sent between the base station 120 and the UEs 111, 112, 113 for the target UE 112. Such communication between the UEs can occur using a local wireless network 404, such as a PAN, NFC, Bluetooth, WiFi-Direct, local mmWave link, etc. In general, the local wireless network 404 may be an ad hoc network, e.g., a network that allows the UEs 111, 112, 113 to communicate directly with one another, without routing communications via the base station 120. Here, all three of the UEs 111, 112, 113 receive RF signals from the base station 120. The UE 112 and the UE 113 demodulate the RF signals to baseband I/Q analog signals, sample the baseband I/Q analog signals to produce I/Q samples, and forward the I/Q samples along with system timing information (e.g., system frame number (SFN)) to the coordinating UE 111 using the local wireless network transceiver 210. The coordinating UE 111 then uses the timing information to synchronize and combine the I/Q samples and processes the combined signal to decode data packets for the target UE 112. The coordinating UE 111 then transmits the data packets to the target UE 112 using the local wireless network 404.

Joint-Transmission

The UE-coordination set 402 enhances the target UE's effective ability to transmit data to the base station 120 and receive data from the base station 120 by generally acting as a distributed antenna of the target UE 112. For example, multiple UEs in the UE-coordination set 402 each use their respective antennas and transmitters to transmit uplink data from the target UE 112 on air interface resources as directed by the base station coordinating the UE-coordination set. In this way, the target UE's uplink data can be processed together and transmitted using the transmitters and the transmission antennas of multiple (including all) UEs in the UE-coordination set 402. In an example, the target UE 112 uses its local wireless network transceiver 210 to transmit uplink data to the coordinating UE 111. The coordinating UE 111 uses its local wireless network transceiver 210 to distribute the data to the other UEs in the UE-coordination set 402. Then, all the UEs in the UE-coordination set 402 process and transmit the uplink data to the base station 120. In this way, the distributed transmission provides for a better effective link budget given the channel impairments encountered by the target UE 112.

In an example, the coordinating UE 111 distributes duplicate uplink signals across the multiple UEs' transmit antennas, which combines the power from multiple UEs' power amplifiers. Distributing the signal across multiple UEs for joint-transmission significantly increases the effective transmit power over any single UE's transmit power. The coordinating UE 111 and the target UE 112 also each transmit the uplink signal. So, the additional UEs in the UE-coordination set function as additional antennas for the target UE 112. In aspects, the UEs in the UE-coordination set 402 communicate with each other and with the coordinating UE 111 using the local wireless network connection (e.g., local wireless network connections 133, 134, 135), such as Wi-Fi.

UEs within the same UE-coordination set 402 can jointly send data packets for the target UE 112 to the base station 120. For example, a subset of UEs in the UE-coordination set 402 can perform joint-transmission for the target UE 112 (or a subset of UEs) within the UE-coordination set 402. The target UE 112 can also send its data to the rest of (or to the subset of) the UEs in the UE-coordination set 402 to enable those other UEs to assist in the transmission of the data for the target UE 112 to the base station 120.

Each UE in the UE-coordination set 402 synchronizes with the base station 120 for timing information and its data transmission resource assignment. Then, after all three UEs in the UE-coordination set 402 have clear transmit channels, the UEs jointly transmit the uplink data to the base station 120. The base station 120 receives the jointly-transmitted uplink data from the UEs 111, 112, 113 and processes the combined signal to decode the uplink data from the target UE 112.

Synchronous Joint-Transmission on an Unlicensed Frequency Band

As described above, when the target UE 112 has uplink data to send to the base station 120, the target UE transmits the uplink data to the coordinating UE 111, which uses the local wireless network 404 to distribute the uplink data to each UE in the UE-coordination set 402. At this point, each UE in the UE-coordination set 402 may transmit its copy of the uplink data to the base station 120 either using licensed or unlicensed frequency bands. Each UE in the UE-coordination set 402 that seeks to transmit using an unlicensed frequency band performs a listen-before-talk (LBT) procedure before each uplink transmission to assess whether a channel in the unlicensed frequency band is clear. The base station 120 can provide different LBT settings and/or thresholds on a per user basis (e.g., different UEs within the UE-coordination set 402 may have different settings for the LBT procedure). These settings and thresholds can include values for backoff timer settings, LBT power thresholds (e.g., energy detection threshold), and so forth.

If, for example, a clear channel assessment of the LBT procedure of UE 113 fails, the UE 113 notifies the coordinating UE 111 over the local wireless network connection 135 of the failure. The UE 113 may also indicate to the coordinating UE 111 a backoff time corresponding to an amount of time that the UE 113 is required to wait until the UE 113 can repeat the clear channel assessment. The coordinating UE 111 can track each UE's LBT-status to determine a backoff time usable for the entire UE-coordination set 402.

In aspects, if the clear channel assessment succeeds and the channel is clear, the UE 113 notifies the coordinating UE 111 that the channel is clear and the UE 113 is ready to initiate transmission of the uplink data to the base station 120. The UE 113 then waits for a response from the coordinating UE 111 in order to synchronize the uplink transmission with the other UEs in the UE-coordination set transmitting on an unlicensed frequency band. Each UE in the UE-coordination set 402 notifies the coordinating UE 111 of its LBT status, including the results of its clear channel assessment and corresponding backoff time. In this way, each UE in the UE-coordination set 402 can adjust the timing of when its uplink transmission begins (e.g., a UE can initiate the uplink transmission at a time that is subsequent to expiration of its own backoff time) such that one or more of the UEs in the UE-coordination set 402 begins the uplink transmission at similar times.

In one example, each UE in the UE-coordination set 402 can wait for a specified time period until a certain number (e.g., a subset or all) of the UEs in the UE-coordination set 402 are allowed to transmit (e.g., have clear channels to use for the uplink transmission). For synchronous joint-transmission, after all of the UEs in the UE-coordination set 402 have clear channels (identified through clear channel assessments), those UEs can begin the uplink transmission. In aspects, the coordinating UE can notify each UE that the uplink transmission can begin. Alternatively, if each UE distributes its clear channel assessment to each other UE in the UE-coordination set 402 (e.g., via group messaging, local broadcast, etc.), then each UE can begin the uplink transmission in response to all the UEs in the UE-coordination set 402 having a clear transmit channel. In either case, the wait time is based on the maximum backoff time across the UEs in the UE-coordination set 402. When the UE with the longest backoff time of all the UEs within the UE-coordination set 402 has a clear channel, then each UE within the UE-coordination set 402 can begin transmitting the uplink data. Accordingly, after a successful clear channel assessment, the UEs wait until they have permission to transmit.

In at least some aspects, the UEs in the UE-coordination set 402 perform the listen-before-talk procedure on a synchronized basis by initializing the procedure at the same time. The backoff time, however, can be fixed (e.g., as in frame-based LBT) or random (e.g., as in load-based LBT). Further, different UEs may experience different levels of interference at their antennas, which may also cause differences in the backoff times of the UEs.

The coordinating UE 111 can set the same uplink transmission duration for all the UEs within the UE-coordination set 402. Accordingly, the coordinating UE 111 can request or direct the UEs in the UE-coordination set 402 to transmit at the same time but the uplink transmission duration for the UE-coordination set 402 can change dynamically due to the backoff procedure of the unlicensed frequency band for individual UEs in the UE-coordination set 402. For example, say normal transmit duration is 1 millisecond and the LBT procedure and backoff for the UE-coordination set 402 takes 100 microseconds, then the available transmission time becomes 900 microseconds.

The coordinating UE 111 can coordinate timing information within the UE-coordination set 402 with respect to the uplink transmission. One problem resulting from the reduction in the available transmission time (e.g., from 1 millisecond to 900 microseconds) due to the backoff of the LBT procedures is that the available transmission time may not be sufficient to transmit all the information that is scheduled for transmission. Therefore, with a limited transmission duration, a policy can be applied that prioritizes different UEs' radio bearers, further description of which is provided below.

Asynchronous Joint-Transmission on an Unlicensed Frequency Band

In at least one aspect, each UE within the UE-coordination set 402 can initiate the uplink transmission when it has a clear channel, without waiting for the other UEs in the UE-coordination set 402. In this case, the UEs do not all transmit at the same time. A UE within the UE-coordination set 402 can distribute its transmit timing information to the other UEs to notify them that it has initiated the uplink transmission. Alternatively, the UE can notify the coordinating UE and the coordinating UE can track the transmit timing information of the UE. The coordinating UE can then relay the transmit timing information to the UEs in the UE-coordination set 402. The coordinating UE can track the transmit timing information of at least a subset (or all) of the UEs within the UE-coordination set 402.

Because different UEs in the UE-coordination set 402 may have different backoff times, the uplink transmission duration can be different for different UEs within the UE-coordination set 402. For example, if an uplink transmission duration is 1.0 ms, a first UE's backoff time is 100 µs, and a second UE's backoff time is 30 µs, then the second UE can initiate the uplink transmission without waiting for the first UEs backoff time to expire.

In aspects, if a particular UE delays its uplink transmission because of medium contention, then when transmission is allowed on a clear channel such that the UE can initiate the uplink transmission, the UE begins transmitting at an OFDM symbol boundary that is based on the transmission timing of at least one other UE that started transmitting at an earlier time. Alternatively, the UE can begin transmitting at an OFDM symbol that has a UE-reference tone. Accordingly, the UE aligns the boundary of the OFDM symbol when initiating the transmission. The coordinating UE can inform the UE of the OFDM symbol to be used for the transmission. The UE can also start transmitting where the UE-reference symbol exists, e.g., the UE initiates its transmission on the symbol where the particular UE started transmission earlier. Different UEs in the UE-coordination set 402 may have different transmission timing. Each UE transmission has its own reference symbol, so the base station 120 can at least estimate the channel from a particular UE when that UE starts transmitting to the base station 120.
Prioritization The base station 120 can set a policy on prioritizing different UEs' radio bearers within the UE-coordination set 402 when LBT protocols limit the transmit opportunity. In an example, if only a limited set of data can be transmitted jointly by the UE-coordination set 402 because the joint transmit opportunity is limited by LBT, the low latency data bearers (e.g., higher Quality of Service (QoS) data bearers) from one or more UEs in the UE-coordination set 402 can be prioritized to be transmitted first by the UE-coordination set 402. The policy can assign other data bearers (e.g., higher-latency data bearers or lower QoS data bearers) a lower priority to cause them to be transmitted subsequent to the higher-priority data bearers.

In aspects, the UEs in the UE-coordination set 402 can transmit the same data for a particular UE, (e.g., the same data is repeated across multiple UEs' antennas effective to increase the link budget). When multiple UEs within a UE-coordination set 402 act as target UEs and thus seek to transmit their own particular data, the coordinating UE can distribute or multiplex each target UE's data to the other UEs in the UE-coordination set 402 over the local wireless network using mmWave or other local wireless link. In an example, the coordinating UE can multiplex the data from the target UEs in the UE-coordination set 402 on the same frequency resources. Alternatively, the coordinating UE can multiplex the data from the target UEs on multiple different frequency resources. To account for the limited transmit opportunity resulting from the LBT procedures, the coordinating UE coordinates the radio bearers of the different UEs in the UE-coordination set 402 based on the prioritization policy set by the base station 120. The coordination includes determining the sequential order or prioritization across the different radio bearers and notifying the UEs in the UE-coordination set 402 of the prioritization.

By prioritizing the radio bearers effective to cause first data to be transmitted first and second data to be transmitted subsequently, the maximum link budget is improved because higher-priority data bearers are handled without competing with lower-priority data bearers. Data bearer QoS requirements are also accounted for by setting a prioritization order across different radio bearers.

Example Procedures

Figure 5:
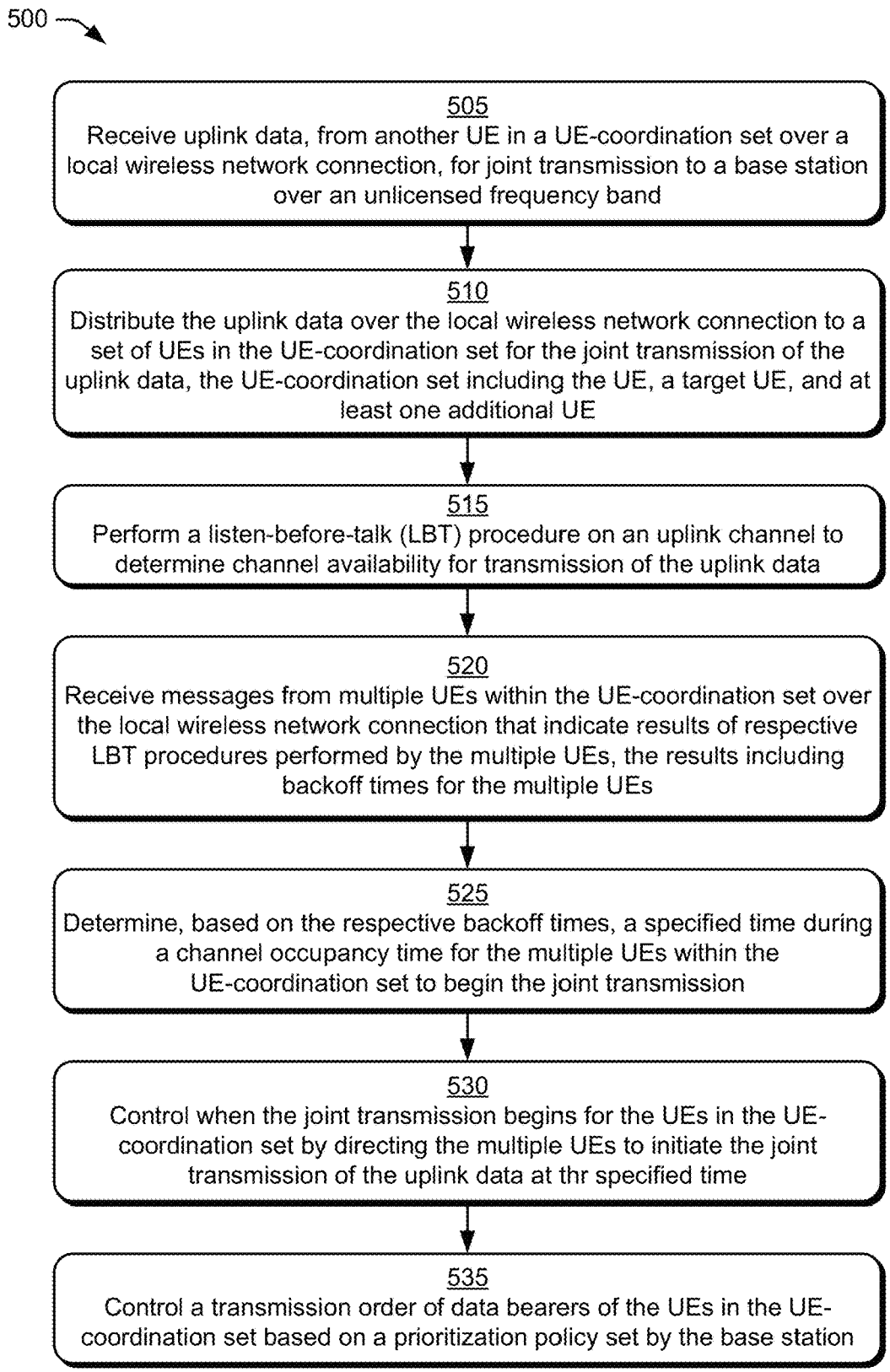
FIG. 5 describes a method performed by a coordinating UE in a wireless communications network.

FIG. 5 describes a method 500 performed by a coordinating UE for coordinating joint-transmission of uplink data in a UE-coordination set over an unlicensed frequency band. The coordinating UE may be UE 111 as previously described, and the UE-coordination set may be UE-coordination set 402 as previously described. At 505, the coordinating UE receives uplink data from a target UE for joint-transmission by the UE-coordination set to a base station over an unlicensed frequency band. The base station may be base station 120 as previously described.

At 510, the coordinating UE distributes the uplink data to multiple UEs in the UE-coordination set for the joint-transmission of the uplink data. The UE-coordination set includes the coordinating UE, the target UE (source of the uplink data), and optionally may include at least one additional UE.

At 515, the coordinating UE performs a listen-before-talk (LBT) procedure on an uplink channel to determine channel availability for transmission of the uplink data. The coordinating UE participates in the joint-transmission over the unlicensed frequency band and therefore identifies a clear channel By performing an LBT procedure, the coordinating UE may also have an associated backoff time.

At 520, the coordinating UE receives messages from one or more UEs in the UE-coordination set over a local wireless network that indicate results of respective LBT procedures performed by the one or more UEs. The results include backoff times for the one or more UEs. As above, at least two different UEs may have different backoff times.

At 525, the coordinating UE determines, based on the respective backoff times, a specified time during a channel occupancy time for the multiple UEs within the UE-coordination set to begin the joint-transmission. The UE compares the various backoff times to determine a specified time that can be used to synchronize the joint-transmission of the uplink data. In one aspect, the specified time may be the same time during the channel occupancy time for all the UEs. Here, the specified time may be based on the greatest (e.g., maximum) backoff time across the UEs within the UE-coordination set, such that after all the UEs within the UE-coordination set have a clear channel, the UEs can begin the joint-transmission. In another aspect, the specified time may be different for different UEs in the UE-coordination set.

At 530, the coordinating UE controls when the joint-transmission begins for the UEs in the UE-coordination set by directing the one or more UEs to initiate the joint-transmission of the uplink at a specified time during a channel occupancy time based at least on the received backoff times. In this way, although the one or more UEs may have a clear channel over which to transmit the uplink data, the UEs wait for the direction from the coordinating UE to initiate the joint-transmission in a synchronous manner. In the asynchronous joint-transmission, the coordinating UE allows one or more of the UEs to begin transmitting when their transmit channel is clear and the transmitting UE sends a message to the coordinating UE indicating that it has initiated the transmission. The coordinating UE receives a similar local message from each individual UE when it begins transmitting to the base station.

At 535, the coordinating UE coordinates or controls a transmission order of data bearers of the UEs in the UE-coordination set based on a prioritization policy set by the base station. Using the policy, the coordinating UE can coordinate which portions of the uplink data are transmitted first and by which UE(s) in the UE-coordination set.

Figure 6:
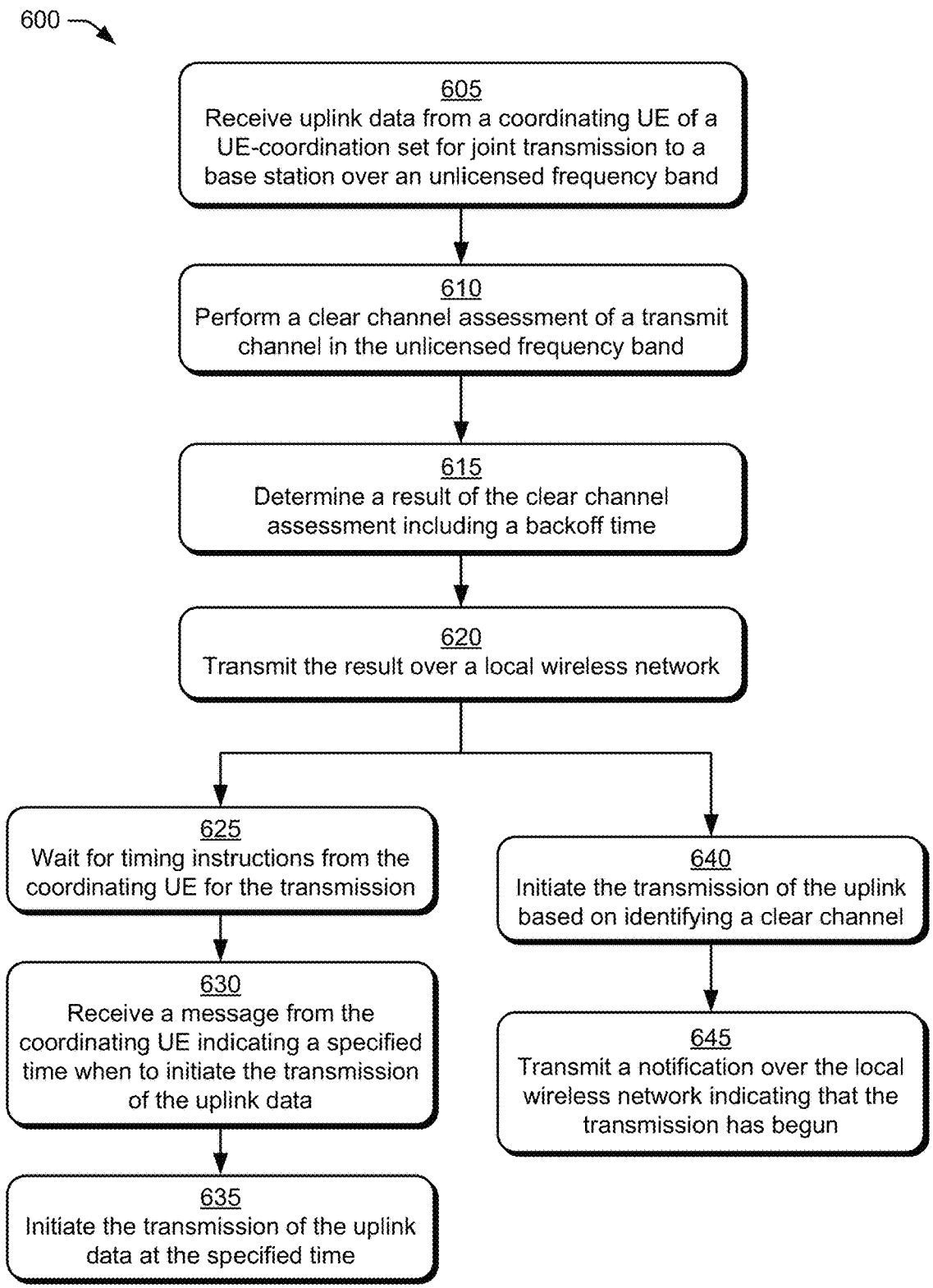
FIG. 6 describes a method performed by a UE within a UE-coordination set in a wireless communications network.

FIG. 6 describes a method 600 performed by a UE within a UE-coordination set in a wireless communications network. This UE may be UE 113 within UE-coordination set 402 as previously described. At 605, the UE 113 receives uplink data from a coordinating UE 111 of a UE-coordination set 402 for joint-transmission to a base station 120 over an unlicensed frequency band. The uplink data may have been generated by another UE (e.g., target UE 112) in the UE-coordination set 402 and relayed by the coordinating UE 111 or may originate from the coordinating UE 111.

At 610, the UE performs a clear channel assessment of an uplink transmit channel in the unlicensed frequency band. At 615, the UE determines a result of the clear channel assessment including a backoff time.

At 620, the UE transmits the result of the clear channel assessment over a local wireless network to the coordinating UE. The UE 113 can transmit the result to the coordinating UE 111 using the local wireless network (e.g., local wireless link 135). Alternatively, the UE 113 can distribute the result to other (including all) UEs (e.g., UE 111, UE 112) in the UE-coordination set 402 over the local wireless network. After 620, the method 600 can branch to either of two different implementations, depending on whether the joint-transmission on the unlicensed frequency band is synchronous (branch to 625) or asynchronous (branch to 640).

At 625, the UE waits for instructions from the coordinating UE for the transmission. For example, if the backoff time expires, the UE 113 can perform another clear channel assessment on the transmit channel. If the transmit channel is clear, the UE 113 still does not immediately initiate the uplink transmission. Rather, the UE 113 waits for instructions from the coordinating UE 111. This enables the UEs in the UE-coordination set 402 to initiate the transmission (joint-transmission) at approximately the same time, hence providing the base station with synchronized uplink data that the base station 120 can efficiently receive and process.

At 630, the UE receives a message from the coordinating UE indicating a specified time to initiate the transmission of the uplink data. In aspects, the specified time is different than the backoff time such that after expiration of the backoff time and after identifying a clear channel, the UE 113 waits until the specified time to initiate transmission of the uplink data. At 635, the UE initiates the transmission of the uplink data to the base station based on the specified time.

As an alternative to waiting for timing instructions per the branch to 625, at 640, the UE autonomously initiates the transmission of the uplink data without waiting for timing instructions from the coordinating UE.

At 645, the UE transmits a notification over the local wireless network to the coordinating UE (and possibly other UEs in the UE-coordination set) indicating that the transmission has begun. This notification provides information to the other UEs within the UE-coordination set 402 and/or the coordinating UE 111 that they can use to coordinate transmissions of the other UEs within the UE-coordination set 402. For example, transmission order of each UE's data bearer(s) can be managed based on a prioritization policy set by the base station 120, examples of which are described above.

Figure 7:
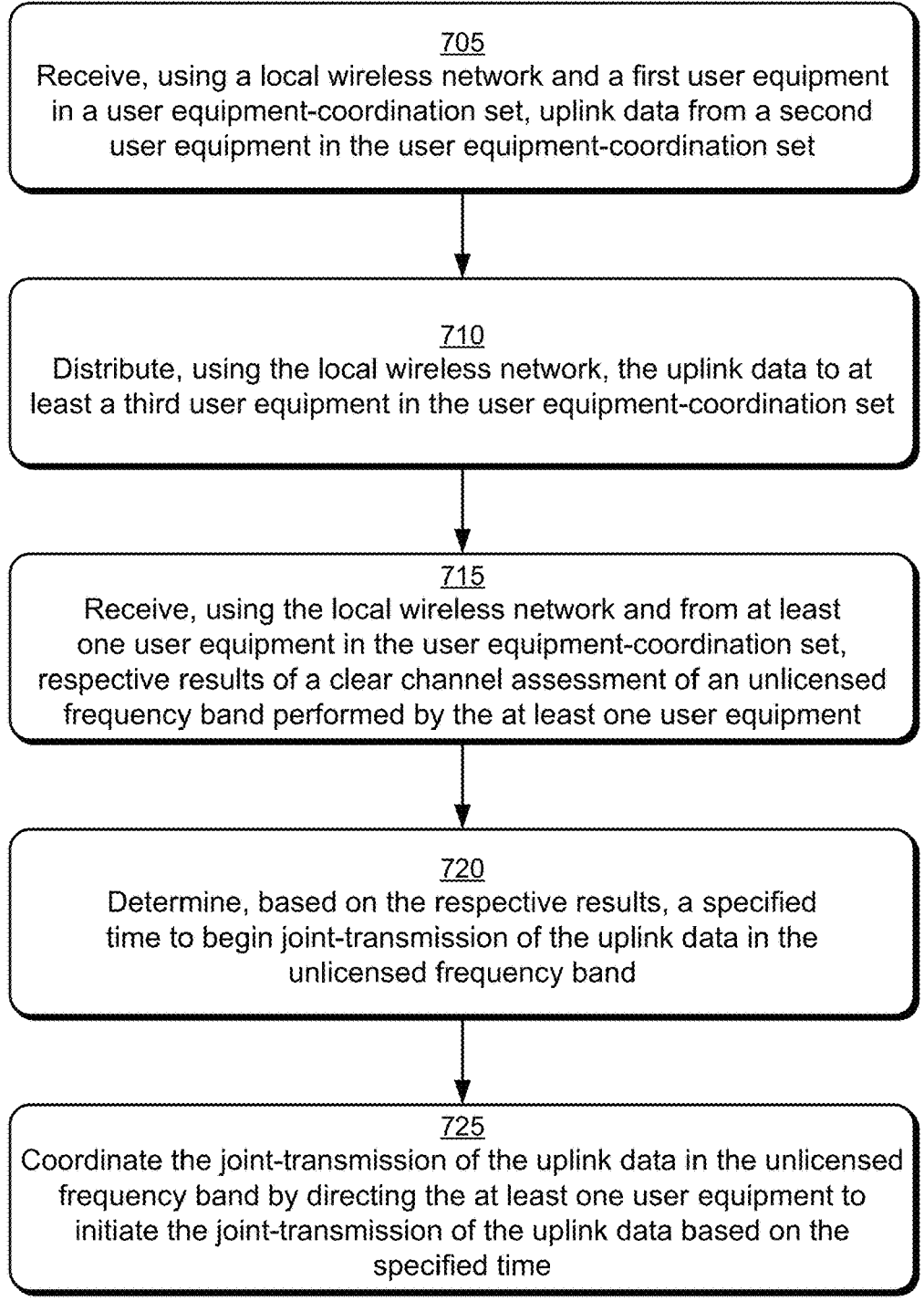
FIG. 7 describes a method performed by a coordinating UE within a UE-coordination set in a wireless communications network.

FIG. 7 describes a method 700 performed by a coordinating UE for coordinating joint-transmission of uplink data in a UE-coordination set over an unlicensed frequency band, such as through synchronous joint-transmission. The coordinating UE may be UE 111, and the UE-coordination set may be UE-coordination set 402 as previously described.

At 705, a coordinating UE that is a first UE in a user equipment-coordination set (UE-coordination set) receives, using a local wireless network connection, uplink data from a second UE in the UE-coordination set. For example, with reference to FIG. 4, the coordinating UE (e.g., UE 111) receives uplink data from a second UE (e.g., UE 112) over the local wireless network connection (e.g., local wireless network connection 134), where the coordinating UE and the second UE are both in a same UE-coordination set (e.g., UE coordination set 404). In implementations, the coordinating UE receives the uplink data from the second UE for joint-transmission of the uplink data (by the UE-coordination set) to a base station over an unlicensed frequency band, such as that described at 505 of FIG. 5.

At 710, the coordinating UE distributes, using the local wireless network connection, the uplink data to at least a third UE in the UE-coordination set. For example, as described with reference to FIG. 4, the coordinating UE (e.g., UE 111) distributes the uplink data to at least a third UE (e.g., UE 113) over the local wireless network connection (e.g., local wireless network connection 135), where the coordinating UE and the third UE are both in a same UE-coordination set (e.g., UE-coordination set 404). Further, as described at 510 with reference to FIG. 5, the coordinating UE sometimes distributes the uplink data to multiple UEs in the UE coordination set, such as by distributing duplicate uplink signals to each UE in the UE-coordination set.

At 715, the coordinating UE receives, using the local wireless network connection and from at least one UE in the UE-coordination set, respective results of a clear channel assessment of the unlicensed frequency band performed by the at least one UE. The coordinating UE (e.g., UE 111), for instance, receives results from a UE (e.g., UE 112, UE 113) over a local wireless network connection (e.g., local wireless connection 134, local wireless network connection 135) as described with reference to FIG. 4. In some implementations, the coordinating UE receives multiple messages from multiple UEs, where each message includes the respective results as described at 520 of FIG. 5. In some implementations, the respective results are generated by the respective UE using a clear channel assessment as described at 610 of FIG. 6.

At 720, the coordinating UE determines, based on the respective results, a specified time to begin joint-transmission of the uplink data in the unlicensed frequency band. For example, as described at 525 with reference to FIG. 5, the coordinating UE (e.g., UE 111) determines a specified time to begin joint-transmission of the uplink data in the unlicensed frequency band. This can include the coordinating UE obtaining, for each UE (e.g., UE 112, UE 113) of the UE-coordination set (e.g., UE-coordination set 404), a respective backoff time from the respective results. Using the respective backoff times, the coordinating UE determines a maximum backoff time by comparing each respective backoff time to one another. In response to determining the maximum backoff time, the coordinating UE then uses the maximum backoff time to set the specified time.

At 725, the coordinating UE coordinates the joint-transmission of the uplink data in the unlicensed frequency band by directing the at least one UE to initiate the joint-transmission of the uplink data based on the specified time. The coordinating UE e.g., UE 111), for instance, coordinates the joint-transmission of the uplink data in the unlicensed frequency band by directing the at least one user equipment (e.g., UE 112, UE 113) to initiate the joint-transmission of the uplink data based on the specified time as describe at 530 of FIG. 5. Alternatively or additionally, the coordinating UE directs each UE in the UE-coordination set to initiate the joint-transmission of the uplink data at the specified time.

In some implementations, the coordinating UE receives from a base station, a message that includes a policy for prioritization of respective radio bearers of multiple UE in the UE-coordination set. The coordinating UE then coordinates the joint-transmission of the uplink data to the base station by coordinating a transmission order of the respective radio bearers based on the policy as described at 535 of FIG. 5.

In one or more implementations, the coordinating UE coordinates the joint-transmission of the uplink data by directing a subset of UEs in the UE-coordination set to begin transmission of the uplink data when each UE in the subset of UEs has a clear channel for uplink transmission For example, as further described with reference to synchronous joint-transmission, the UEs wait for a specified time period until a certain number of UEs (e.g., the subset or all) in the UE-coordination set are allowed to transmit (e.g., have clear channels to use for the uplink transmission).

In some implementations, the coordinating UE participates in the joint-transmission. As one example, the coordinating UE identifies a clear channel in the unlicensed frequency band by performing a clear channel assessment as described at 515 of FIG. 5. In response to identifying the clear channel, the coordinating UE participates in the joint-transmission of the uplink data by transmitting the uplink data using the clear channel as also described at 515 of FIG. 5.

Figure 8:
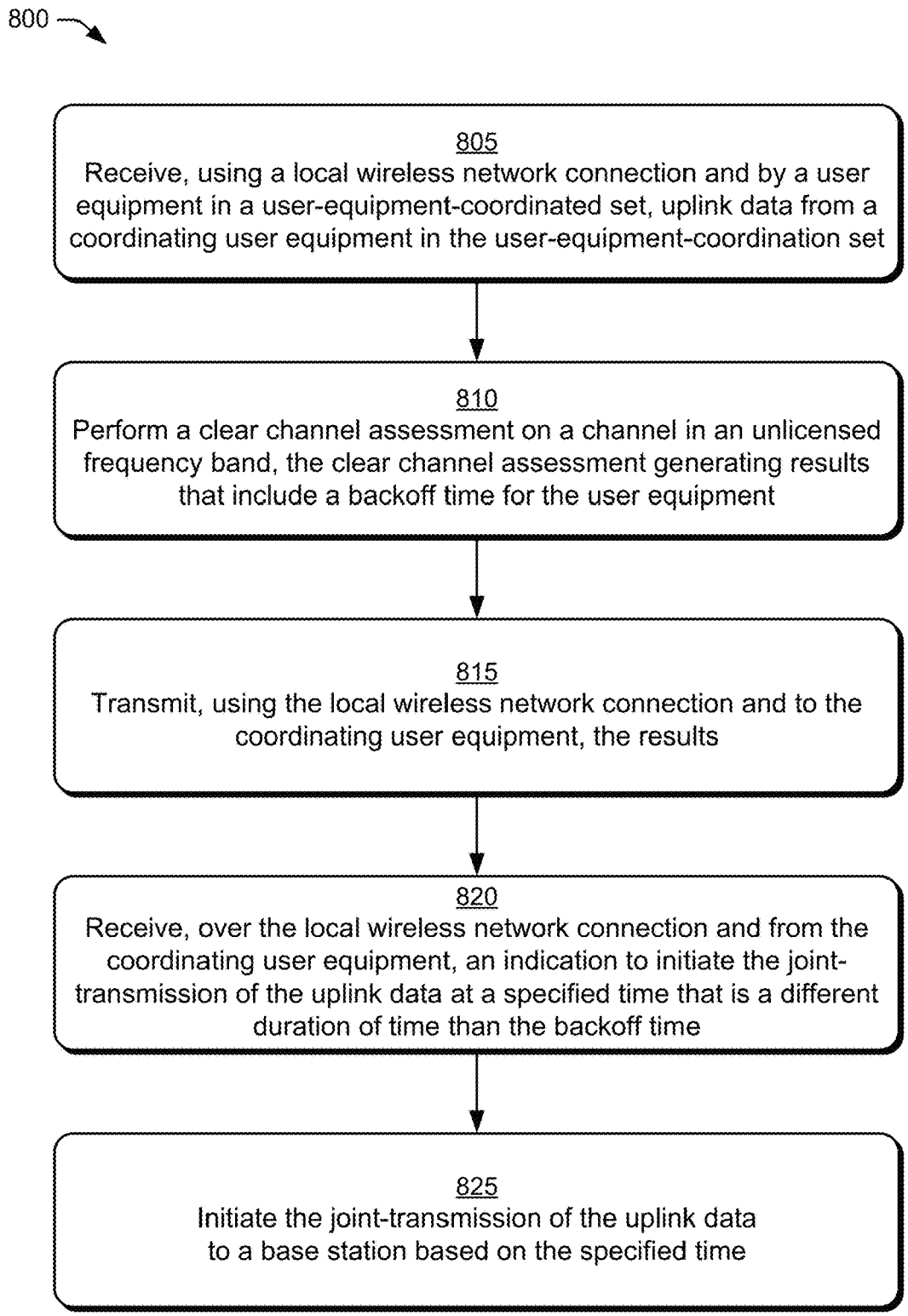
FIG. 8 describes a method performed by a UE within a UE-coordination set in a wireless communications network.

FIG. 8 describes a method 800 performed by a UE for coordinating joint-transmission of uplink data in a UE-coordination set over an unlicensed frequency band. For example, the UE 113 and/or the UE 112 within UE-coordination set 402 may perform the method 800.

At 805, a UE in a UE-coordination set receives, using a local wireless network connection, uplink data from a coordinating UE in the UE-coordination set. For example, the UE (e.g., UE 113) receives the uplink data from the coordinating UE (e.g., UE 111) using the local wireless network connection (e.g., local wireless network connection 135), where the UE and the coordinating UE are included in the same UE-coordination set (e.g., UE-coordination set 402). As described at 605 with reference to FIG. 6, the UE receives the uplink data for joint-transmission (e.g., joint-transmission using an unlicensed frequency band).

At 810, the UE performs a clear channel assessment on a channel in the unlicensed frequency band, where the clear channel assessment generates results that include a backoff time for the UE. The UE (e.g., UE 113), for instance, performs the clear channel assessment as described at 610 of FIG. 6.

At 815, the UE transmits, using the local wireless network connection and to the coordinating UE, the results. For example, the UE (e.g., UE 113) transmits the results to the coordinating UE (e.g., UE 111) using the local wireless network connection (e.g., local wireless network connection 135) as described at 620 of FIG. 6. Alternatively or additionally, the UE generates results that indicate a successful clear channel assessment of the channel in the unlicensed frequency band, and distributes the successful clear channel assessment to one or more UEs in the UE-coordination set, such as through the use of group messaging or a local broadcast as described with reference to synchronous joint-transmission.

At 820, the UE receives, over the local wireless network connection and from the coordinating UE, an indication to initiate the joint-transmission of the uplink data at a specified time that is a different duration of time than the backoff time. The UE (e.g., UE 113), for instance, receives the indication over the local wireless network connection (e.g., local wireless network connection 135), where the indication includes the specified time as described at 630 of FIG. 6. As one example, the UE receives an indication of an orthogonal frequency-division multiplexing symbol boundary as the specified time.

At 825, the UE initiates the joint-transmission of uplink data in an unlicensed frequency band and to a base station based on the specified time. For example, the UE (e.g., UE 113) initiates the joint-transmission of the uplink data after waiting for the specified time, where the specified time is longer than the backoff time of the UE. In some implementations, the UE performs a second clear channel assessment on the channel in the unlicensed frequency band while waiting the duration of time for the specified time.

In some implementations, the UE waits for the UEs, in a subset of UEs in the UE-coordinated set, to have a clear channel for the joint-transmission. At times, the UE determines that each UE has the clear channel by receiving, from each UE in the subset of UEs, an indication of the clear channel.

FIG. 9 describes a method 900 performed by a coordinating UE for coordinating joint-transmission of uplink data in a UE-coordination set over an unlicensed frequency band, such as through asynchronous joint-transmission. The coordinating UE may be UE 111 and the UE-coordination set may be UE-coordination set 402 as previously described.

At 905, the coordinating UE receives, using a local wireless network connection, uplink data from a target UE that is a second UE in a UE-coordination set, where the coordinating UE is a first UE in the UE-coordination set. For example, the coordinating UE (e.g., UE 111) receives the uplink data from the target UE (e.g., UE 112) over the location wireless network connection (e.g., local wireless network connection 134) as described at 505 of FIG. 5.

At 910, the coordinating UE distributes, using the local wireless network connection, the uplink data to at least a third UE included in the UE-coordination set. The coordinating UE (e.g., UE 111), for instance, distributes the uplink data to the UE (e.g., UE 113) using the local wireless network connection (e.g., local wireless network connection 135) as described at 510 of FIG. 5. This can include the coordinating UE distributing duplicate uplink signals to multiple UEs in the UE-coordination set.

At 915, the coordinating UE determines that at least one UE in the UE-coordination set has initiated transmission of the uplink data over the unlicensed frequency band. For example, the coordinating UE (e.g., UE 111) determines that at least one UE (e.g., UE 112, UE 113) in the UE-coordination set (e.g., UE-coordination set 402) has initiated transmission of the uplink data as described with reference to asynchronous joint-transmission, such as by receiving, from the at least one UE, a notification of the transmission as described at 645 of FIG. 6. In implementations, the notification includes transmit timing information.

At 920, the coordinating UE coordinates the joint-transmission of the uplink data to a base station by relaying, to one or more other UEs in the UE-coordination set other than the at least one UE, transmit timing information associated with the transmission of the uplink data by the at least one UE. For example, the coordinating UE (e.g., UE 111) coordinates the joint-transmission in an unlicensed frequency band by transmitting the transmit timing information to other UEs in the UE-coordination set as described with reference to asynchronous joint-transmission.

In some implementations, the coordinating UE determines that a particular UE, in the UE-coordination set, delays transmission of the uplink data relative to the at least one UE due to medium contention, such as that described with reference to asynchronous joint-transmission. In such scenarios, the coordinating UE sometimes directs the particular UE to begin transmission of the uplink data at an orthogonal frequency-division multiplexing symbol boundary based on the transmit timing information.

Alternatively or additionally, the coordinating UE receives, from the base station, a message that includes a policy for prioritization of respective radio bearers of UEs in the UE-coordination set. To coordinate the joint-transmission, the coordinating UE sometimes coordinates a transmission order of the respective radio bearers of the UEs in the UE-coordination set based on the policy.

At times, the coordinating UE participates in the coordinated joint-transmission. To illustrate, the coordinating UE identifies a clear channel in the unlicensed frequency band by performing clear channel assessment. In response to identifying the clear channel, the coordinating UE then participates in the joint-transmission of the uplink data by transmitting the uplink data using the clear channel.

FIG. 10 describes a method 1000 performed by a UE for coordinating joint-transmission of uplink data in a UE-coordination set over an unlicensed frequency band. This UE may be UE 113 within UE-coordination set 402 as previously described.

At 1005, a UE that is a first UE in a UE-coordination set receives, over a local wireless network connection, uplink data from a coordinating UE that is a second user equipment in the UE-coordination set. The UE (e.g., UE 113), as one example, receives the uplink data over the local wireless network connection (e.g., local wireless network connection 135) from the coordinating UE (e.g., UE 111) as described at 605 of FIG. 6. At times, this includes receiving a duplicate signal that represents the uplink data.

At 1010, the UE performs a clear channel assessment on a channel in an unlicensed frequency band, the clear channel assessment generating results that indicate the channel is clear for the joint-transmission of the uplink data. For instance, the UE (e.g., UE 113) performs the clear channel assessment as described at 610 of FIG. 6.

At 1015, the UE initiates the joint-transmission of the uplink data. To illustrate, the UE (e.g., UE 113) initiates the joint-transmission of the uplink data as described at 640 of FIG. 6. In some implementations, the UE initiates the joint-transmission without waiting for another UE in the UE-coordination set.

At 1020, the UE transmits, over the local wireless network connection and to the coordinating UE, an indication of the initiating the joint-transmission. For instance, the UE (e.g., UE 113) transmits an indication of the initiating to the coordinating UE (e.g., UE 111) using the local wireless network connection (e.g., local wireless network connection 135), where the indication includes, at times, transmit timing information corresponding to the initiating by the UE. Alternatively or additionally, the UE transmits, over the local wireless network connection and to at least a third UE in the UE-coordination set, transmit timing information corresponding to the initiating.

Generally, any of the components, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

CONCLUSION

Although techniques and devices for a UE-coordination set for a wireless network using an unlicensed frequency band have been described in language specific to features and/or methods, it is to be understood that the subject of the appended claims is not necessarily limited to the specific features or methods described. Rather, the specific features and methods are disclosed as example implementations of a UE-coordination set for a wireless network using an unlicensed frequency band.

In the following, several examples are described:

Example 1: A method for coordinating joint-transmission of uplink data to a base station by a first user equipment configured as a coordinating user equipment for a user equipment-coordination set in an unlicensed frequency band, the method comprising the coordinating user equipment: receiving, using a local wireless network connection, the uplink data from a second user equipment in the user equipment-coordination set; distributing, using the local wireless network connection, the uplink data to at least a third user equipment in the user equipment-coordination set; receiving, using the local wireless network connection and from at least one user equipment in the user equipment-coordination set, respective results of a clear channel assessment of the unlicensed frequency band performed by the at least one user equipment; determining, based on the respective results, a specified time to begin joint-transmission of the uplink data in the unlicensed frequency band; and coordinating the joint-transmission of the uplink data in the unlicensed frequency band by directing the at least one user equipment to initiate the joint-transmission of the uplink data based on the specified time.

Example 2: The method as recited in example 1, wherein the determining the specified time comprises: obtaining, for each user equipment of the user equipment-coordination set, a respective backoff time from the respective results; determining a maximum backoff time by comparing each respective backoff time to one another; and using the maximum backoff time to set the specified time.

Example 3: The method as recited in example 1, wherein the coordinating the joint-transmission comprises: directing each user equipment in the user equipment-coordination set to initiate the joint-transmission of the uplink data at the specified time.

Example 4: The method as recited in any one of the preceding examples, further comprising: identifying a clear channel in the unlicensed frequency band by performing a clear channel assessment using the coordinating user equipment; and in response to identifying the clear channel, participating in the joint-transmission of the uplink data by transmitting the uplink data using the clear channel.

Example 5: The method as recited in any one of the preceding examples, wherein distributing the uplink data to at least the one user equipment comprises distributing duplicate uplink signals to each user equipment in the user equipment-coordination set.

Example 6: The method as recited in any one of the preceding examples, further comprising: receiving, from the base station, a message that includes a policy for prioritization of respective radio bearers of multiple user equipments in the user equipment-coordination set, and wherein the coordinating the joint-transmission of the uplink data to the base station further comprises coordinating a transmission order of the respective radio bearers based on the policy.

Example 7: The method as recited in example 1, wherein the coordinating the joint-transmission of the uplink data further comprises: directing a subset of user equipments in the user equipment-coordination set to begin transmission of the uplink data when each user equipment in the subset of user equipments has a clear channel for uplink transmission.

Example 8: A method for coordinating joint-transmission of uplink data to a base station over an unlicensed frequency band, the method comprising: receiving, using a local wireless network connection and by a user equipment in a user equipment-coordination set, uplink data from a coordinating user equipment in the user equipment-coordination set; performing a clear channel assessment on a channel in the unlicensed frequency band, the clear channel assessment generating results that include a backoff time for the user equipment; transmitting, using the local wireless network connection and to the coordinating user equipment, the results; receiving, over the local wireless network connection and from the coordinating user equipment, an indication to initiate the joint-transmission of the uplink data at a specified time that is a different duration of time than the backoff time; and initiating the joint-transmission of the uplink data to the base station based on the specified time.

Example 9: The method as recited in example 8, wherein receiving the indication to initiate the joint-transmission further comprises: receiving an indication of an orthogonal frequency-division multiplexing symbol boundary as the specified time.

Example 10: The method as recited in example 8 or example 9, wherein the initiating the joint-transmission of the uplink data based on the specified time further comprises: waiting for the specified time for longer than the backoff time.

Example 11: The method as recited in example 10, wherein waiting for the specified time further comprises: waiting for each user equipment, in a subset of user equipments in the user equipment-coordination set, to have a clear channel for the joint-transmission.

Example 12: The method as recited in example 11, further comprising: determining that each user equipment has the clear channel by receiving, from each user equipment in the subset of user equipments an indication of the clear channel.

Example 13: The method as recited in any one of examples 8 to 12, wherein performing the clear channel assessment further comprises: generating results that indicate a successful clear channel assessment of the channel in the unlicensed frequency band; and distributing the successful clear channel assessment to one or more user equipments in the user equipment-coordination set.

Example 14: The method as recited in any one of examples 8 to 13, further comprising: performing a second clear channel assessment on the channel in the unlicensed frequency band while waiting the duration of time for the specified time.

Example 15: A user equipment apparatus comprising: at least one wireless transceiver; a local wireless transceiver; a processor; and computer-readable storage media comprising instructions, responsive to execution by the processor, for directing the user equipment apparatus to perform any one of the methods recited in examples 1 to 14 using at least the local wireless transceiver or the at least one wireless transceiver.

Example 16: A method for coordinating joint-transmission of uplink data to a base station by a first user equipment configured as a coordinating user equipment for a user equipment-coordination set in an unlicensed frequency band, the method comprising the coordinating user equipment: receiving, using a local wireless network connection, uplink data from a target user equipment that is a second user equipment in the user equipment-coordination set; distributing, using the local wireless network connection, the uplink data to at least a third user equipment included in the user equipment-coordination set; determining that at least one user equipment in the user equipment-coordination set has initiated transmission of the uplink data over the unlicensed frequency band; and coordinating the joint-transmission of the uplink data to the base station by relaying, to one or more other user equipments in the user equipment-coordination set other than the at least one user equipment, transmit timing information associated with the transmission of the uplink data by the at least one user equipment.

Example 17: The method as recited in example 16, wherein determining that the at least one user equipment has initiated transmission of the uplink data further comprises: receiving, from the at least one user equipment, a notification of the transmission.

Example 18: The method as recited in example 17, wherein receiving the notification further comprises: receiving the transmit timing information with the notification.

Example 19: The method as recited in any one of examples 16 to 18, further comprising: identifying a clear channel in the unlicensed frequency band by performing clear channel assessment; and in response to identifying the clear channel, participating in the joint-transmission of the uplink data by transmitting the uplink data using the clear channel.

Example 20: The method as recited in any one of examples 16 to 19, wherein distributing the uplink data to the at least third user equipment comprises distributing duplicate uplink signals to multiple user equipments in the user equipment-coordination set.

Example 21: The method as recited in any one of examples 16 to 20, further comprising: determining that a particular user equipment, in the user equipment-coordination set, delays transmission of the uplink data relative to the at least one user equipment due to medium contention; and directing the particular user equipment to begin transmission of the uplink data at an orthogonal frequency-division multiplexing symbol boundary based on the transmit timing information.

Example 22: The method as recited in any one of examples 16 to 21, further comprising: receiving, from the base station, a message that includes a policy for prioritization of respective radio bearers of user equipments in the user equipment-coordination set, and wherein the coordinating the joint-transmission of the uplink data to the base station further comprises coordinating a transmission order of the respective radio bearers based on the policy.

Example 23: A method performed by a first user equipment in a user equipment-coordination set for coordinating joint-transmission of uplink data to a base station over an unlicensed frequency band, the method comprising: receiving, over a local wireless network connection, uplink data from a coordinating user equipment that is a second user equipment in the user equipment-coordination set; performing a clear channel assessment on a channel in the unlicensed frequency band, the clear channel assessment generating results that indicate the channel is clear for the joint-transmission of the uplink data; initiating the joint-transmission of the uplink data; and transmitting, over the local wireless network connection and to the coordinating user equipment, an indication of the initiating the joint-transmission.

Example 24: The method as recited in example 23, further comprising: transmitting, over the local wireless network connection and to the coordinating user equipment, transmit timing information corresponding to the initiating the joint-transmission.

Example 25: The method as recited in example 23, further comprising: transmitting, over the local wireless network connection and to at least a third user equipment in the user equipment-coordination set, transmit timing information corresponding to the initiating the joint-transmission.

Example 26: The method as recited in example 23, wherein initiating the joint-transmission of the uplink data further comprises: initiating the joint-transmission of the uplink data without waiting for another user equipment in the user equipment-coordination set.

Example 27: A computer-readable medium comprising instructions that, when executed by one or more processors, cause a device incorporating the one or more processors to perform any one of the methods of examples 1 to 14 and 16 to 26.

What is claimed is:

1. A method for coordinating joint-transmission of uplink data to a base station by a first user equipment configured as a coordinating user equipment for a user equipment-coordination set in an unlicensed frequency band, the method comprising the coordinating user equipment:
receiving, using a local wireless network connection, the uplink data from a second user equipment in the user equipment-coordination set;
distributing, using the local wireless network connection, the uplink data to at least a third user equipment in the user equipment-coordination set, the distributing the uplink data to at least the third user equipment comprising distributing duplicate uplink signals to multiple user equipments in the user equipment-coordination set;
receiving, using the local wireless network connection and from at least one user equipment in the user equipment-coordination set, results of a clear channel assessment of the unlicensed frequency band performed by the at least one user equipment;
determining, based on the results, a specified time to begin joint-transmission of the uplink data in the unlicensed frequency band; and
coordinating the joint-transmission of the uplink data in the unlicensed frequency band by directing the at least one user equipment to initiate the joint-transmission of the uplink data based on the specified time.

2. The method as recited in claim 1, wherein the determining the specified time comprises:
obtaining, from the at least one user equipment of the user equipment-coordination set, a backoff time from the results;
determining a maximum backoff time by comparing each obtained backoff time; and
using the maximum backoff time to set the specified time.

3. The method as recited in claim 1, wherein the coordinating the joint-transmission comprises:
directing the at least one user equipment in the user equipment-coordination set to initiate the joint-transmission of the uplink data at the specified time.

4. The method as recited in claim 1, further comprising:
identifying a clear channel in the unlicensed frequency band by performing a clear channel assessment using the coordinating user equipment; and
in response to identifying the clear channel, participating in the joint-transmission of the uplink data by transmitting the uplink data using the clear channel.

5. The method as recited in claim 1, further comprising:
receiving, from the base station, a message that includes a policy for prioritization of radio bearers of multiple user equipments in the user equipment-coordination set, and
wherein the coordinating the joint-transmission of the uplink data to the base station further comprises coordinating a transmission order of the radio bearers based on the policy.

6. The method as recited in claim 1, wherein the coordinating the joint-transmission of the uplink data further comprises:
directing a subset of user equipments in the user equipment-coordination set to begin transmission of the uplink data when each user equipment in the subset of user equipments has a clear channel for uplink transmission.

7. A method for coordinating joint-transmission of uplink data to a base station over an unlicensed frequency band, the method comprising:
receiving, using a local wireless network connection and by a user equipment in a user equipment-coordination set, uplink data from a coordinating user equipment in the user equipment-coordination set, the uplink data comprising duplicate uplink signals supplied to another user equipment in the user equipment-coordination set;
performing a clear channel assessment on a channel in the unlicensed frequency band, the clear channel assessment generating results that include a backoff time for the user equipment;
transmitting, using the local wireless network connection and to the coordinating user equipment, the results;
receiving, over the local wireless network connection and from the coordinating user equipment, an indication to initiate the joint-transmission of the uplink data at a specified time that is a different duration of time than the backoff time; and
initiating the joint-transmission of the uplink data to the base station based on the specified time.

8. The method as recited in claim 7, wherein receiving the indication to initiate the joint-transmission further comprises:
receiving an indication of an orthogonal frequency-division multiplexing symbol boundary as the specified time.

9. The method as recited in claim 7, wherein the initiating the joint-transmission of the uplink data based on the specified time further comprises:
waiting for the specified time to initiate the joint-transmission of the uplink data, the specified time occurring after an expiration of the backoff time.

10. The method as recited in claim 9, wherein waiting for the specified time further comprises:
waiting for each user equipment, in a subset of user equipments in the user equipment-coordination set, to have a clear channel for the joint-transmission.

11. The method as recited in claim 10, further comprising:
determining that each user equipment has the clear channel by receiving, from each user equipment in the subset of user equipments an indication of the clear channel.

12. The method as recited in claim 7, wherein performing the clear channel assessment further comprises:
generating results that indicate a successful clear channel assessment of the channel in the unlicensed frequency band; and
distributing the successful clear channel assessment to one or more user equipments in the user equipment-coordination set.

13. The method as recited in claim 7, further comprising:
performing a second clear channel assessment on the channel in the unlicensed frequency band while waiting the duration of time for the specified time.

14. A user equipment apparatus comprising:
at least one wireless transceiver;
a local wireless transceiver;

a processor; and computer-readable storage media comprising instructions, responsive to execution by the processor, for directing the user equipment apparatus to operations comprising:

receiving, as a first user equipment in a user equipment-coordination set and using a local wireless network connection, uplink data from a second user equipment in the user equipment-coordination set;

distributing, using the local wireless network connection, the uplink data to at least a third user equipment in the user equipment-coordination set by distributing duplicate uplink signals to each user equipment in the user equipment-coordination set;

receiving, using the local wireless network connection and from at least one user equipment in the user equipment-coordination set, results of a clear channel assessment of an unlicensed frequency band performed by the at least one user equipment;

determining, based on the results, a specified time to begin joint-transmission of the uplink data in the unlicensed frequency band; and coordinating the joint-transmission of the uplink data in the unlicensed frequency band by directing the at least one user equipment to initiate the joint-transmission of the uplink data based on the specified time.

15. The user equipment as recited in claim 14, wherein the computer-readable storage media comprises instructions that direct the user equipment apparatus to determine the specified time by:

obtaining, for each user equipment of the user equipment-coordination set, a backoff time from the results;

determining a maximum backoff time by comparing each backoff time to one another; and using the maximum backoff time to set the specified time.

16. The user equipment as recited in claim 14, wherein the computer-readable storage media comprises instructions that direct the user equipment apparatus to coordinate the joint-transmission by:

directing each user equipment in the user equipment-coordination set to initiate the joint-transmission of the uplink data at the specified time.

17. The user equipment as recited in claim 14, wherein the computer-readable storage media comprises instructions that direct the user equipment apparatus to perform further operations comprising:

identifying a clear channel in the unlicensed frequency band by performing a clear channel assessment using the coordinating user equipment; and in response to identifying the clear channel, participating in the joint-transmission of the uplink data by transmitting the uplink data using the clear channel.

18. The user equipment as recited in claim 14, wherein the computer-readable storage media comprises instructions that direct the user equipment apparatus to perform further operations comprising:

receiving, from a base station, a message that includes a policy for prioritization of radio bearers of multiple user equipments in the user equipment-coordination set, and wherein the coordinating the joint-transmission of the uplink data to the base station further comprises coordinating a transmission order of the radio bearers based on the policy.

19. The user equipment as recited in claim 14, wherein the coordinating the joint-transmission of the uplink data further comprises:

directing a subset of user equipments in the user equipment-coordination set to begin transmission of the uplink data when each user equipment in the subset of user equipments has a clear channel for uplink transmission.

* * * * *